United States Patent [19]

Cheng

[11] Patent Number: 4,931,225
[45] Date of Patent: Jun. 5, 1990

[54] METHOD AND APPARATUS FOR DISPERSING A GAS INTO A LIQUID

[75] Inventor: Alan T. Cheng, Bloomfield, N.J.

[73] Assignee: Union Carbide Industrial Gases Technology Corporation, Danbury, Conn.

[21] Appl. No.: 317,577

[22] Filed: Mar. 1, 1989

Related U.S. Application Data

[63] Continuation-in-part of Ser. No. 139,462, Dec. 30, 1987, Pat. No. 4,861,352.

[51] Int. Cl.$^5$ .............................................. B01F 3/04
[52] U.S. Cl. .............................. 261/76; 261/DIG. 75; 261/DIG. 78; 417/151
[58] Field of Search ............... 417/151; 261/DIG. 78, 261/DIG. 76, DIG. 75

[56] References Cited

U.S. PATENT DOCUMENTS

| | | | |
|---|---|---|---|
| 2,060,557 | 11/1936 | Davis | 261/DIG. 76 |
| 2,413,102 | 12/1946 | Ebert et al. | 261/DIG. 75 |
| 2,756,685 | 7/1956 | Hoogendonk | 417/151 |
| 3,064,878 | 11/1962 | Bayles et al. | 417/151 |
| 3,331,590 | 7/1967 | Battenfeld et al. | 261/DIG. 78 |
| 3,371,618 | 3/1968 | Chambers | 261/DIG. 75 |
| 3,400,818 | 9/1968 | Tarjan | 209/170 |
| 3,494,296 | 2/1970 | Gluntz | 261/DIG. 78 |
| 3,545,886 | 12/1970 | Chalom | 261/DIG. 78 |
| 3,625,820 | 12/1971 | Gluntz | 417/151 |
| 3,734,111 | 5/1973 | McClintock | 261/DIG. 75 |
| 3,741,484 | 6/1973 | Cresswell | 261/DIG. 78 |
| 3,778,038 | 12/1973 | Eversole et al. | 261/DIG. 78 |
| 4,226,719 | 10/1980 | Woltman | 261/DIG. 75 |
| 4,244,821 | 1/1981 | Molvar | 261/DIG. 76 |
| 4,261,347 | 4/1981 | Spencer, III | 261/DIG. 75 |
| 4,632,649 | 12/1986 | Segebrecht et al. | 417/151 |
| 4,639,340 | 1/1987 | Garrett | 261/DIG. 78 |
| 4,743,405 | 5/1988 | Durao et al. | 261/76 |
| 4,867,918 | 9/1989 | Kiyonaga et al. | 261/76 |

FOREIGN PATENT DOCUMENTS

| | | | |
|---|---|---|---|
| 1428285 | 5/1969 | Fed. Rep. of Germany | 261/DIG. 78 |
| 1517502 | 11/1970 | Fed. Rep. of Germany | 261/DIG. 78 |
| 2201607 | 8/1972 | Fed. Rep. of Germany | 261/DIG. 78 |
| 767405 | 9/1980 | U.S.S.R. | 417/151 |
| 694918 | 7/1953 | United Kingdom | 261/122 |

*Primary Examiner*—Tim Miles
*Attorney, Agent, or Firm*—S. Church; P. Kent

[57] ABSTRACT

The present invention relates to an improved method and apparatus for dispersing a gas into a liquid. Gas is injected into a liquid and the flowing gas-liquid mixture is accelerated by a flow area contraction to at least sonic flow velocity, and subsequently decelerated by a flow area expansion to subsonic velocity. The attendant shock waves disperse the gas in the liquid. Preferred embodiments include off-centering the gas injection direction from the centerline of the contracting flow area and controlling the pressure at the exit of the expanding flow area.

30 Claims, 23 Drawing Sheets

GAS DISPERSION DURING REACTION PROCESS

METHOD AND APPARATUS FOR DISPERSING A GAS INTO A LIQUID

This application is a continuation-in part of application Ser. No. 07/139,462, filed Dec. 30, 1987, which is now Pat. No. 4,861,352.

BACKGROUND OF THE INVENTION

1. Field of the Invention

The present invention relates to a method and apparatus which can be used to better disperse a gas into a liquid. The dispersed gas can be soluble in the liquid, in which case the improved dispersion aids in dissolution of the gas into the liquid. The dispersed gas can be immiscible in (or have low solubility in) the liquid and can be used to strip (remove) dissolved gas or other high vapor pressure component from the liquid, in which case the improved dispersion of the stripping gas improves the stripping rate. In addition, there are applications wherein it is desired to react a gas with a liquid or with a reactant which is dispersed in the liquid, in which case the improved dispersion of the gas in the liquid increases the reaction rate between the gas added to the liquid and the liquid or between the gas and the other reactant present in the liquid. The functional portion of the apparatus for dispersing the gas is preferably fitted to the inside of a pipeline so the gas dispersion can be accomplished while the gas-liquid mixture is traveling through the pipeline.

2. Background of the Invention

Various methods of dissolving a gas in a liquid are known in the art. Given sufficient surface area and contact time, and a liquid which is not saturated with the gas under the existing temperature and pressure conditions, the gas can be dissolved in the liquid. Typically the gas is introduced into the liquid in a manner which provides for good mixing between the gas to be dissolved and the liquid, to improve the efficiency of the dissolution.

U.S. Pat. No. 3,778,038 to Eversole, dated Dec. 11, 1973, describes a method of distributing fuel in air followed by passing the air and fuel mixture through a constricted zone to increase the velocity of the mixture to sonic. Downstream from the constricted sonic zone, the air and fuel mixture is accelerated to supersonic velocity in a supersonic zone. Thereafter, the mixture is decelerated to subsonic velocity in a subsonic zone to produce a shock zone where the fuel droplets entrained in the air are believed to be further subdivided and uniformly distributed throughout the combustible mixture before the mixture is supplied to an engine cylinder.

U.S. Pat. No. 4,639,340 to Garrett, dated Jan. 27, 1987, discloses a method for dissolving gas in a liquid comprising pressurizing a stream of liquid, introducing the gas into the pressurized stream to form a gas-liquid mixture traveling at a velocity less than the velocity of sound in the liquid, accelerating the pressurized mixture stream to a supersonic velocity to create a first shockwave effective to reduce the size of the gas bubbles in the stream, thereby forming a dispersion of the gas under pressure in the liquid, reducing the velocity of the stream below sonic velocity, and transporting the presurized stream to an outlet near which the velocity of the pressurized stream is accelerated to supersonic velocity once more to create a second shockwave prior to exit of the stream from the outlet.

U.S. Pat. No. 4,743,405 to Durao et al., dated May 10, 1988 discloses an apparatus for injecting a gas such as carbon dioxide into a flowing liquid. The liquid is contained in a three-section conduit consisting of converging, bottle-neck and diverging sections. The sections are joined end-to-end without concordance radii so as to produce a turbulent effect in the liquid flowing thorough the conduit. An annular chamber is disposed about the bottleneck section and includes a connection to a source of pressurized gas or the like. The annular chamber is separated from the bottleneck by a wall perforated with micro-holes which allow gas entrainment into the flowing liquid. A plurality of hollow needles which extend varying amounts into the liquid flow are disposed in the wall to provide multiple sites of gas injection in the annular chamber.

The present invention utilizes several of the techniques discussed above to introduce gas into a liquid, but provides an improved method and apparatus which improves the efficiency of the gas dissolution into the liquid.

The removal of a gas or a high vapor pressure component dissolved or held in suspension in a liquid by contacting the liquid with a stripping gas is also known in the art. The requirement for removal of the dissolved gas or high vapor pressure component is that its partial pressure in the stripping gas be lower than the partial pressure of the dissolved gas or high vapor pressure component in the liquid, thus permitting mass transfer from the liquid into the stripping gas. The rate of removal from the liquid is controlled by the rate of diffusion from the liquid into the stripping gas phase. The dissolved gas or high vapor pressure component in the liquid reaches equilibrium with the dissolved gas or high vapor pressure component in the stripping gas in time, after which no additional diffusion from the liquid occurs. The conditions for equilibrium may be described by Henry's Law.

A good description of typical equilibrium phenomenon and of the kinds of parameters involved was presented in the Proceedings of the 17th Congress of European Brewing Convention, pp. 245-58, 1979, in an article by J. Hoggan et al., entitled "A Simple Production System For The De-oxygenation of Water". This article describes a method of removing (stripping) dissolved oxygen from brew using nitrogen gas as the stripping gas. United Kingdom Provisional Patent Specification No. 1,156,417 of Harold Davidge and Charles Sydney Gibbs, published June 25, 1969, describes a method of removing dissolved oxygen from liquids by bubbling through the liquid a gas having a lower partial pressure of oxygen than that of the liquid, which gas does not react chemically with the liquid. A sparging device is used to feed the stripping gas, nitrogen, into the liquid. The oxygen removal rate is substantially increased by causing turbulent flow of the liquid stream at a point downstream of the point of introduction of the nitrogen gas. Different devices capable of creating turbulence are described.

There are numerous applications for stripping gases out of liquids, one of the most common being stripping oxygen from liquids. Typical examples, not intended to be limiting, follow. In enhanced oil recovery, sea water is injected directly into oil wells. It is necessary to remove dissolved oxygen from the sea water prior to its use to minimize corrosion. The de-oxygenated water typically has less than 0.1 to 1 ppm of dissolved oxygen. In most cases, the oxygen removal is effected by vacuum de-aeration or hydrocarbon stripping. U.S. Pat. No. 4,017,276 to Bloem, dated Apr. 12, 1977, discloses a method of stripping dissolved oxygen from sea water using a nitrogen stripping gas. Sea water is introduced into a stripping tower, and as the result of countercurrent contact between the nitrogen stripping gas and the sea water, oxygen concentrations as low as 7.5 to 12 ppm remain in the sea water after stripping. U.S. Pat No. 4,612,021 to Palmer, dated Sept. 16, 986, and United Kingdom Patent Application GB 127711, dated Apr. 18, 1984, disclose methods of de-oxygenating seawater used in water flood petroleum recovery. United Kingdom Patent GB 1531537, issued Nov. 8, 1978, discloses a method of using nitrogen gas to remove dissolved oxygen from sea water. The nitrogen is placed into cocurrent flow with the sea water and then mixed into the sea water using an in line static mixer; the mixture is subsequently fed into a cyclone separator.

De-oxygenation of boiler feed water has typically been carried out in thermal de-aerators by raising the temperature of the water with steam A. Beevers, Process Engineering of London, Vol. 66, No. 8, p. 41, August 1985, in an article entitled "Cool Way to De-aerate", reported using nitrogen as a stripping gas to remove oxygen and carbon dioxide from boiler feed water. Japanese Patent JP 60/183012 discloses a method for removing dissolved oxygen in boiler feed water by nitrogen stripping.

Japanese Patent JP 56/121681 discloses a method of removing oxygen from the water in an open cooling system used in a tire plant. The cooling water is sparged with nitrogen at a nitrogen:water ratio of 6:1.

Japanese Patent JP 59/154109 discloses a method of sparging industrial water with nitrogen to reduce the oxygen content of such water to less than 0.1 ppm dissolved oxygen.

Japanese Patent JP 58/133885 describes a method of removing oxygen from process water by sparging with nitrogen at reduced pressure.

U.S. Pat. No. 2,413,102 to Ebert, et al., dated Dec. 24, 1946, describes a method of removing dissolved gases from liquids or solutions. In general, the invention involves the commingling of a gaseous stream, such as of air and a stream of the solution to be de-gassed by forcing them together through one or more constrictions in a conduit opening into a region of reduced pressure, such as into a vessel in which a vacuum is maintained.

U.S. Pat. No. 3,132,013 to Kumamoto et al., dated May 5, 1964, describes a process for treating feed water, including the removal of oxygen from the water using a nitrogen stripping gas.

U.S. Pat. No. 3,732,668 to Nichols, dated May 15, 1973, discloses a system for inserting aircraft fuel tanks, whereby dissolved oxygen is removed from the fuel.

U.S. Pat. No. 4,352,682 to Kemp, Jr. et al., dated Oct. 5, 1982, describes a de-oxygenating unit for removal of oxygen from water which is to be used to produce carbonated beverages.

U.S. Pat. No. 4,259,360 to Venetucci et al, dated Mar. 31, 1981 describes a method of reducing dissolved oxygen content of foodstuffs and of water used in beverage production by gas sparging with nitrogen.

Most of the art cited above demonstrates the stripping of a first gas from a liquid using a second stripping gas. The objective is to obtain maximum removal of the first gas while minimizing power consumption as well as consumption of the stripping gas. It is also possible to remove particulate contaminants from a liquid using a stripping gas. The particulates may adhere to the stripping gas itself or may adhere to a volatile component within the liquid which is removed from the liquid by the stripping gas.

Stripping gas consumption has been reduced by generation of better mixing between the stripping gas and the liquid. The improved mixing may increase the available surface area of the stripping gas, and improves distribution of the stripping gas throughout the liquid. Either of these actions increases mass transfer of volatile components and/or particulates from the liquid into the stripping gas. However, the increased mixing has been achieved by creating turbulence between the stripping gas and the liquid, by methods such as in-line static mixers and the use of mixing chambers containing insoluble reticulated material through which the stripping gas-liquid mixture must pass. Increased turbulence has been obtained at the cost of increased pressure drop across process lines and mixing chambers, necessitating higher operating pressures, which tend to force the first, dissolved gas back into the liquid and to increase power consumption.

It would be desirable to find a method of increasing the effective surface area of the stripping gas which does not generate significantly increased system operational pressures (with accompanying detriment to separation and increased power consumption costs). The method and apparatus of the present invention provide an improvement over the known art which improves the overall efficiency in dispersion of the stripping gas.

SUMMARY OF THE INVENTION

In accordance with the present invention, a method and apparatus are provided which can be used to better disperse a gas or vapor into a liquid. When the dispersed gas or vapor is soluble in the liquid, the dispersion aids in dissolution of the gas into the liquid. When the dispersed gas or vapor is immiscible in or has low solubility in the liquid, the gas or vapor can be used to remove other dissolved or entrained gases or high vapor pressure components which are initially present in the liquid from the liquid. When it is desired to react the gas or vapor with the liquid or with a reactant which is present in the liquid, the reaction rate between the gas or vapor and the liquid or between the gas or vapor and a reactant present in the liquid is increased by the increased dispersion of the gas or vapor in the liquid.

A method for dissolving a gas or vapor in a liquid comprises:

(a) contacting said gas or vapor with a liquid in which said gas or vapor is soluble, wherein said contact is made by injecting said gas or vapor into said liquid at a linear velocity which is at least sonic for at least a portion of said gas or vapor at the time of said contact;

(b) causing cocurrent flow of a composition comprising said liquid and said dissolving gas or vapor; and (c) causing at least a portion of said cocurrently flowing composition to flow at a linear velocity which is at least sonic.

A method for dispersing a reactant gas or vapor into a liquid whereby the reaction rate is increased between said reactant gas or vapor and said liquid or between said reactant gas and another reactant present within said liquid comprises the steps of:

(a) contacting said reactant gas or vapor with said liquid, wherein said contact is made by injecting said gas or vapor into said liquid;

(b) causing cocurrent flow of a composition comprising said reactant gas and said liquid; and (c) causing at least a portion of said cocurrently flowing composition to flow at a linear velocity which is at least sonic.

A method for removing a dissolved or entrained gas or high vapor pressure component initially present in a liquid can also be used to remove particulate matter which may be present in the liquid. Thus, the initially present gas, or particulate matter or the combinations thereof are removed from liquid. The initially present gas, vapor, or high vapor pressure component is removed from the liquid by a method comprising the steps of:

(a) contacting said liquid with a stripping gas or vapor which is immiscible in or which has low solubility in said liquid under operating conditions said stripping gas or vapor being different from said gas, vapor or high vapor pressure component initially present in said liquid which is to be separated from said liquid (b) causing cocurrent flow of a composition comprising said liquid and said stripping gas or vapor;

(c) causing at least a portion of said cocurrently flowing composition to flow at a linear velocity which is at least sonic; and (d) separating said stripping gas or vapor from said liquid, whereby at least a portion of said initially present gas or high vapor pressure component is removed from said liquid. The initially present gas or vapor to be removed from the liquid diffuses into the stripping gas or vapor to achieve thermodynamic equilibrium and is subsequently separated along with the immiscible or low solubility stripping substance from the liquid. When particulate matter is removed from the liquid, the particulates must adhere to the stripping gas itself or must adhere to the initially present gas which is being removed from the liquid by diffusing into the stripping gas.

The method of the present invention is an improvement over previous methods of dispersing gases into liquids which use similar mass transfer techniques. It provides a non mechanical method for the formation of extremely small (smaller than 1 mm and preferably smaller than 0.01 mm) bubbles of the gas or vapor being dispersed within the liquid. The smaller bubbles increase the available surface area of the gas or vapor being dispersed. This increased surface area provides increased mass transfer or increased reaction surface area (rate) as the case may be. The smaller bubbles also increase the surface area to which particulates can adhere. The preferred method of the present invention permits operation of the gas dispersion system at relatively low pressures, facilitating improved dispersion at reduced pumping power requirements. In addition, the preferred method of the present invention is carried out using means placed within a pipeline through which the mixture of gases and liquids flows, providing a relatively simple means for obtaining the dispersion and accompanying mass transfer or reaction. Thus the apparatus and method disclosed herein enable operational cost reductions over previously known technology by providing increased dispersion efficiency at reduced power consumption.

The preferred in line gas dispersing process can be a single stage process, whereby cocurrent flow of the gas or vapor with the liquid provides the contact time necessary for gas or vapor dissolution or reaction, or for the initially present gas to be removed from the liquid into the stripping gas, or for mass transfer of particulate matter by adherence. More than one of the gas or vapor dispersing apparatus can be placed in series in a pipeline to increase the amount of mass transfer obtained; it is also possible to recycle the gas-liquid mixture through the pipeline containing the dispersing apparatus to increase the amount of mass transfer.

The method of the present invention utilizes either feed of the gas or vapor to be dispersed into the liquid at a supersonic (at least sonic) flow rate for the dispersing gas or vapor, or supersonic flow of the dispersing gas-liquid mixture or combinations thereof, to generate at least one shockwave which creates extremely small bubbles of the dispersing gas or vapor within the mixture, thereby increasing dramatically the surface area of dispersing gas to provide increased mass transfer interface. The speed of sound in water is about 4,700 to about 4,800 ft/sec. The speed of sound in air is about 1,100 ft/sec. During investigation leading to the present invention, it was discovered that when a gas or vapor entered a liquid at a linear velocity greater than about 1,100 ft/sec, a localized sonic shock wave occurred which shattered the gas or vapor into the extremely small bubbles which can be dispersed into the liquid phase.

The presence of gas or vapor bubbles in a liquid dramatically reduces the speed of sound in the mixture or dispersion of gas/vapor-liquid. This phenomenon is described by Susan Werner Kieffer, in "Sound Speed in liquid-Gas Mixtures: Water-Air and Water-Steam", Journal of Geophysical Research, Vol. 82, No. 20, pp. 2895–2904, July 10, 1977. Methods of calculation of sound velocity in multicomponent fluids are presented by D. J. Picard and P. R. Bishnol, in "Calculation of the Thermodynamic Sound Velocity in Two-Phase Multicomponent Fluids", Int. J. Multiphase Flow, Vol. 13, No. 3, pp. 295–308, 1987. The subject matter of these two references is hereby incorporated by reference.

An example of the above reduction of sound velocity in a gas-vapor/liquid mixture is an air-water mixture of about 1:1 by volume; in this mixture, the speed of sound decreases to about 50 ft/sec., depending on temperature and pressure. Thus, when this fluid mixture of air and water travels at a theoretical linear velocity greater than about 50 ft/sec., a sonic shock wave occurs, causing the air to break up into extremely small bubbles within the water. This same principal is used, in the method of the present invention, to generate extremely small bubbles of the gas or vapor to be dissolved or reacted or extremely small bubbles of an immiscible or very low solubility stripping gas within a liquid at relatively low linear flow velocities.

In the method of the present invention, the supersonic (at least sonic) flow necessary to create the shockwave is obtained by one of three means: (1). by injecting a gas or vapor at a velocity which is supersonic for the gas or vapor at the point of injection into a liquid or fluid mixture, preferably in a pipeline; (2). by injecting a gas or vapor into a liquid or fluid mixture so that it enters the liquid at a velocity which is subsonic for the gas or vapor at its point of injection, but wherein the gas or vapor passes, in combination with the liquid, directly through a flow accelerating configuration which increases the linear flow velocity of at least a portion of the gas-liquid combination to a supersonic velocity; (3). by injecting the gas or vapor into the liquid at a supersonic speed for the gas or vapor, and then causing the resulting combination of gas and liquid to pass through a flow accelerating configuration whereby the linear velocity of at least a portion of the combination becomes supersonic.

Of the three means described above, it is preferred to use means (2) and most preferred to use means (3). There is apparently some form of energy transfer effect which occurs when the two phase (gas and liquid mixture) flow undergoes a sonic shockwave. The mass transfer which occurs is greater than that which would be expected based on the increase in mass transfer surface area alone.

It has been discovered, during investigation of the method of the present invention, that localized shockwaves can occur at points across the fluid flow profile at which sonic velocity of the flowing composition is exceeded. Due to the size of in-line stripping device which will be used in some applications, the linear velocity of flow is highest at the centerline of the flow profile, and localized shockwaves occur at this location. Thus, it is possible to benefit from the method of the present invention even though the average linear velocity for the gas-liquid mixture through the in-line stripping device is subsonic.

It is possible to use more than one gas dispersing device in series in a pipeline to increase the mass transfer, degree of reaction, or amount of separation via stripping which can be obtained in a single pass of the liquid to be treated through the pipeline. During experimentation, it was discovered that typically less than 60 seconds of in-line time is required for substantially thermodynamic equilibrium to occur between the partial pressures of the gas or vapor dispersed in the liquid and volatile components initially present in the liquid.

During the stripping of volatiles from liquids using the present method, the stripping gas or vapor can approach saturation after a single pass through a stripping device. It is, then, typically advisable to permit separation of the stripping gas or vapor from the liquid mixture and to introduce a new quantity of stripping gas or vapor prior to passing the liquid mixture with stripping gas dispersed therein through a second in line stripping device.

A mixture of a dispersed gas which is to be dissolved in or reacted with a liquid can be recycled through the same in-line stripping device as often as necessary to permit dissolution of the gas or reaction of the gas with the liquid or other reactants contained in the liquid.

A liquid from which volatile components such as gases are to be removed, and/or from which particulate matter is to be separated, can be recycled through the same in line stripping device; however, it is important to have the stripping gas or vapor be capable of accepting the mass transfer of additional volatile component or particulate matter, or recycling is not useful. The amount of dissolution of a gas to be dissolved into a liquid depends on factors such as the solubility of the gas in the liquid; the amount of surface area between the dissolving gas and the liquid; operating temperature; operating pressure and residence time of the gas-liquid mixture while in contact with each other.

The amount of reaction between a dispersed as with a liquid or other reactant contained in the liquid depends on factors such as the concentration of the reactant dispersing gas in the liquid; the concentration of other reactants contained in the liquid; intrinsic reaction rate or reaction kinetics between the reactants; the amount of surface area between the dispersed gas and the liquid or reactant contained in the liquid; operating temperature; operating pressure and reaction time during which the dispersed gas reactant and the liquid reactant are in contact with each other.

The mass transfer of gases or vapors initially present in the liquid from the liquid to a stripping gas or vapor depends mainly on the following factors: amount of initially present gas or volatile component present in the stripping gas and present in the liquid: the amount of surface area between the stripping gas and the liquid, through which mass transfer can occur; operating temperature; operating pressure; and contact time of the stripping gas-liquid composition prior to separation. In a pipeline of given diameter, the volumetric flow rate of the composition through the pipeline determines the linear velocity of the composition flowing through the in-line stripping device, as well as the residence or contact time of the composition in the pipeline prior to separation of the immiscible or low solubility stripping gas from the liquid mixture.

The present invention requires that the linear velocity of at least a portion of a mixture of the gas or vapor (to be dissolved, reacted, or to act as a stripping substance) and the liquid reach supersonic speed.

An in line device used to increase the linear flow velocity of the gas or vapor-liquid composition can be any device which provides an accelerating pattern of flow sufficient to produce supersonic velocity in at least a portion of the composition However, the size of bubbles obtained for a given dispersed gas/liquid composition (and thus the mass transfer and reaction surface area), the operational pressure required, and the power consumption within the system will depend on the in-line device structural configuration and on the position of injection of the gas or vapor into the liquid relative to the flow accelerating device.

The preferred in-line device comprises a type of venturi configuration comprising at least an incoming compression cone through which the gas-liquid composition enters and an expansion cone through which the composition exits. This kind of in-line device is preferred because it facilitates the reduction of pressure drop across the in-line device, reducing the required system operational pressure and the pumping (power) costs for operation of the device. The most preferred in-line device comprises a gas or vapor injecting nozzle positioned inside the compression cone of a venturi configuration and off center from the center line of the venturi configuration The injected gas and a liquid are passed through the configuration to accelerate the velocity of the gas-liquid mixture, so that at least a portion of the mixture reaches supersonic velocity.

For a given dispersing gas-liquid composition, the dispersing operation can be made most efficient by providing the desired gas dispersion at minimum dispersing gas consumption and power consumption The power consumption of the system and the amount of dispersing gas required can be reduced by optimizing the structural configuration of the gas dispersing device and by changing process variables, not intended to be limiting, such as in-line residence time and linear velocity through the dispersing device via volumetric flow rate, temperature, in line pressure, relative volume of dispersing gas or vapor per volume of liquid processed, and initial concentration of dispersing gas, or reactants, or gas to be removed in the liquid.

Regarding the gas dispersing device structural configuration, when the device comprises an injection nozzle and a venturi configuration, it has been discovered that the effectiveness of the device is increased by placing the injection nozzle from which the gas to be dispersed enters the liquid mixture closer to the beginning of the venturi throat or closer to the smallest diameter opening in the venturi configuration, whichever is applicable, since the venturi device need not have a significant throat. However, the system operating pressure and the pumping power required to move the dispersing gas-liquid composition through the pipeline increases as the nozzle is moved closer to the venturi throat. Thus, for each gas dispersing system, there is a nozzle injector position at which the necessary gas dispersion is obtained at minimal pumping cost for that venturi configuration.

There are also structural limitations on injector placement. As the compression cone included angle of the venturi configuration becomes smaller, the injector must be placed a greater distance upstream of the venturi throat. As the diameter of the venturi throat becomes smaller, the injector must be placed a greater distance upstream of the venturi throat.

In addition, it has been discovered that when the injection nozzle is placed within the compression cone which forms the entry to the venturi device, placement of the nozzle off-center from the centerline of the compression cone provides significantly improved gas dispersion. When the nozzle is placed off-center, such that the outer edge of the nozzle touches the side wall of the compression cone, there is reduced channeling of the gas through the center of the liquid stream without mixing with the liquid stream. This is especially important when the nozzle is moved closer to the throat of the venturi device and as the diameter of the venturi throat is increased relative to the nozzle size.

Examples of preferred in-line device configurations follow. The injector position should be at least about 0.1 pipe diameters prior to the beginning of the venturi throat or prior to the smallest diameter opening in the venturi configuration, depending on process variables which will be discussed later herein. The preferred injector position ranges from about 0.2 to about 25 pipe diameters upstream (prior to) of the venturi throat or smallest diameter opening. The preferred position is within the venturi configuration compression cone. The most preferred injector nozzle location is within the compression cone and off center from the center line of the compression cone. When the injector nozzle is located off center from the venturi configuration center line, the position of the nozzle relative to the throat location of the venturi is limited by the compression cone wall. There is a compromise which must be reached between position of the nozzle upstream of the venturi throat and the distance off center at which the nozzle can be located.

The preferred venturi throat length for many applications is the minimum which materials and methods of construction will permit. Although a better mass transfer rate is achieved with a longer venturi throat, pumping power consumption increases rapidly with increasing throat length, so that, in general, overall efficiency (expressed as mass transfer rate divided by fluid mixture pumping power consumption) improves as the length of the venturi throat decreases. The overall efficiency also increases as the venturi throat diameter or smallest diameter opening of the venturi configuration is increased. Again, a better mass transfer rate is achieved using a smaller venturi throat or opening diameter and a longer venturi throat length, but pumping power consumption increases, so that a larger diameter opening and shorter throat length often improves the overall operational efficiency. However, the venturi opening size must remain such that supersonic flow of the dispersing gas-liquid composition is achieved at least at some points across the flow profile of the composition. For throats or openings as small as about 0.15 pipe diameters, the position of the stripping substance injector upstream of the opening is not as critical, but as the opening size increases to about 0.19 pipe diameters or greater, overall efficiency of gas dispersion (expressed as mass transfer rate divided by fluid mixture pumping power consumption) improves when the injector is positioned from about 1 to about 2 pipe diameters upstream of the throat or opening The preferred injector position is off-center and within the compression cone of the venturi configuration, as previously described.

The exit pressure of the dispersed gas-liquid mixture as it leaves the expansion cone venturi configuration, or the back pressure, affects the gas or vapor-liquid relationship as described by Henry's law. High back pressure favors gas dissolution and low back pressure favors stripping of gases initially present in the liquid from the liquid into the dispersed gas. However, the pressure drop through the venturi was unexpectedly influenced by the magnitude of the venturi exit pressure, so that overall efficiency of stripping of initially present gases from the liquid is improved by increasing the venturi exit pressure. However, as is apparent from viewing FIGS. 17 and 18, after an initial increase in back pressure up to about 15-20 psig, the rate of increase in efficiency is less with increasing pressure. Since the decrease in fractional reduction continues to be very significant with increasing pressure, the overall benefit of increasing back pressure over about 15 to 20 psig may be insubstantial. At increased pressure, an increase in linear velocity is required to achieve sonic flow of the gas-liquid mixture.

In addition to the above, it has been discovered that injection of the gas to be dispersed into the liquid at a velocity which is supersonic (at least sonic) for the dispersing gas as it exits the injector provides an improvement in the gas dispersion over that which can be achieved when the injection velocity of the dispersing gas is subsonic. The overall efficiency of gas dispersion (expressed as mass transfer rate divided by fluid mixture pumping power consumption) is improved with use of supersonic injection of the dispersing gas, since no significant increase in power consumption was observed while mass transfer rate was increased.

The power consumption can be reduced by positioning the dispersing gas injector farther upstream of the venturi throat or smallest diameter opening in the venturi configuration. However, it has been discovered that moving the nozzle upstream and away from the entrance to the venturi throat or smallest diameter opening results in the formation of larger bubbles of dispersed gas after the sonic shock wave and prior to entry into the flow accelerating configuration. Thus, one must balance the higher system operating pressure necessary when the injector is closer to the venturi throat with the size of dispersed gas bubble formation. As discussed above, there are preferred ranges for the location of the injector relative to the venturi throat or opening.

In addition, the power consumption can be reduced in all cases by reducing the compression cone angle, or the expansion cone angle, or both, of the venturi configuration. The limiting factors are the ability to fabricate a configuration having smaller cone angles, the ability to place the injector near the venturi throat or minimum opening, and amount of piping space in which the in line gas dispersing device must be installed.

In general, to obtain a specific fractional reduction of a gas or vapor initially present in the liquid, given a limited in line residence time, it is necessary to increase the volume of stripping gas or vapor per volume of liquid as the venturi opening size increases (all other variables held constant).

It has also been discovered, in general, that for a given venturi opening size, once the average linear velocity of the stripping gas liquid composition reaches theoretical supersonic velocity through the in-line stripping device, there is little advantage, in terms of fractional reduction, to using an increased composition linear velocity. Typically, the volume of stripping substance required per volume of mixture remains relatively constant, so long as the extremely small bubbles of stripping gas are formed and total residence time of the composition in the pipeline (in and subsequent to the in-line device) is adequate.

It has also been discovered that for a specific volumetric ratio of stripping gas to liquid, the stripping efficiency, measured as mass transfer rate divided by processing power requirements (pumping horsepower requirements), can be optimized by controlling stripping gas nozzle position relative to the smallest diameter of the venturi opening, so the size of the stripping bubbles produced (smaller bubbles provide increased volatile component mass transfer) is balanced against pumping costs.

In general, to optimize the stripping gas dispersion apparatus for a given stripping application, one must provide the lowest total cost for stripping gas consumption and pumping power. One does this by pumping a given stripping gas-liquid composition at the lowest linear velocity which will provide supersonic flow in at least a portion of the composition and create the necessary shock wave. Lower operating pressure favors removal of high vapor pressure components such as gases from liquids. The linear velocity necessary to achieve sonic flow of the gas-liquid mixture increases as the system pressure increases, favoring low pressure operation of the system. However, the unexpected increase in efficiency when the back pressure at the exit of the gas stripping apparatus is increased must be considered. Therefore, it is possible to find an optimum balance between pumping power consumption and stripping rate by adjusting the back pressure downstream of the gas dispersion apparatus.

For a given liquid throughput rate, one initially sizes the smallest diameter portion of the venturi opening as large as possible and still maintain the capability of obtaining supersonic velocity. This provides the lowest system pressure at which the supersonic velocity occurs. Pumping costs are reduced while separation of the volatile component from the liquid mixture is obtained. The stripping gas consumption will typically be high under these conditions. One then selects an injector nozzle which has the smallest outside diameter acceptable in terms of operational pressure for stripping gas feed. This provides the least restriction to flow of the liquid through the in-line device. One then decreases the smallest diameter portion of the venturi opening within limits the injector size will permit, simultaneously adjusting the volumetric flow rate of stripping substance, until total costs for power and stripping substance consumption are minimized for the desired processed liquid composition. Operational back pressure should also be considered during design of the gas dispersion apparatus, since operating efficiency depends on this back pressure as previously discussed. Typically the limiting factors in design are the volumetric rate at which the liquid must be processed and the final composition of the liquid which must be achieved. Again, within the limitations required for injection of the stripping gas, the smaller the included angle of the compression cone and the smaller the included angle of the expansion cone of the venturi device, the lower the permanent pressure drop across the device in general.

The time required to closely approach substantial thermodynamic equilibrium of the gas to be separated between stripping gas and the liquid varies from a fraction of a second to a few minutes depending on the gas-liquid mixture characteristics. Thus, the flow rate of the combined mixture or composition through the stripping device and subsequent piping, prior to separation of the stripping substance from the mixture, should provide the necessary few seconds' residence time. The operating temperature must be balanced between product stability and stripping efficiency factors. Typically increased temperature results in a decrease in mixture viscosity, which is an advantage in reduced pumping pressure requirements. In addition, it has been discovered that, typically, although solubility of the initially present gas in the liquid increases with increasing temperature, the increase in diffusion rate of the initially present gas from the mixture into the stripping gas more than compensates for the solubility increase. The operating temperature can be increased as high as slightly below the boiling point of the liquid at the system operating pressure.

For purposes of the specification and claims provided herein, the following terms are intended to have the following provided meanings.

Liquid means one or more substances in combination wherein the combined composition is liquid at system operating conditions. The liquid can comprise miscible and/or immiscible components. The liquid can be a solution, suspension, or a dispersion of liquid droplets or suspended solids as in a slurry.

Initially present gas or vapor means an individual substance or combination of substances which are present in the liquid prior to addition of the gas to be dispersed. The initially present gas may include some of the gas which is to be dispersed. However, when an initially present gas is to be removed from the liquid, the stripping gas selected is different from the initially present gas to be removed.

Stripping gas or vapor means any substance which is immiscible with or has low solubility in the liquid under the operating conditions, such as temperature and pressure, of the system. Typically, the stripping gas should not react with at least the lower vapor pressure component of the liquid.

Dissolved component means there is no distinctive phase between this component and the fluid mixture.

Extremely small bubbles means bubbles having a diameter less than about 0.1 mm.

Immiscible means there is a distinctive phase separation which occurs upon mixing.

Fractional reduction means $$\frac{(C_{in} - C_{out})}{C_{in}}$$

wherein Cin is the initial concentration of a component upstream of an in-line stripping device, and Cout is the concentration of the component at a location immediately following or downstream of an in line stripping device. In the present specification if Cout is determined other than immediately following the in-line stripping device, the downstream location at which Cout was measured is specified.

Percent Saturation means
$$\frac{C_{sat} - C_{out}}{C_{sat}} \times 100$$

wherein Csat is the concentration of a gas dissolved in a liquid when the liquid is saturated with the gas, and Cout is the concentration of the gas in the liquid at a location immediately following or downstream of the in-line stripping device. In the present specification if Cout is determined other than immediately following the gas dispersing device, the downstream location at which Cout was measured is specified.

Back pressure is the line pressure measured near the outlet from the gas dispersing device. The line pressure immediately following the gas dispersing device exit and the line pressure a short distance downstream of the exit are essentially the same, provided the pipeline inside of which the device is placed is smooth.

Included angle means the angle between the internal walls of the venturi cone configuration.

This parent application of the present continuation in-part application was filed simultaneously in the United States of America with a related patent application regarding the use of a similar in-line device to dissolve a gas in a liquid. The related application is Ser. No. 7/139,573, filed Dec. 30, 1987 by K. Kiyonaga, et al., entitled, "Improved Gas Dispersion Process and System", the subject matter of which is hereby incorporated by reference.

DESCRIPTION OF THE DRAWINGS

FIG. 5 shows the nozzle at a location inside the venturi compression cone, the nozzle is adjustable as indicated, so that it can be moved to any preferred position. The nozzle sleeve is designed to permit the adjustment of the nozzle position.

FIG. 6 shows the efficiency of the dissolution in terms of mass transfer rate (ppm/sec-HP) divided by the power consumption in horsepower as a function of the position of the gas injection nozzle from the venturi throat. The efficiency is shown for two different liquid (water) flow rates.

DESCRIPTION OF THE PREFERRED EMBODIMENTS

The present invention provides a method and apparatus for dispersing a gas or vapor into a liquid. A soluble gas can be dissolved into a liquid. A reactant gas can be better dispersed into a liquid to increase the reaction rate between the gas and the liquid or a reactant contained in the liquid. An immiscible or low solubility gas can be dispersed to strip (remove) a volatile component which was initially present in a liquid from the liquid. Particulate matter can also be removed from a liquid by the method of the present invention. Several different liquid mixtures have been processed using varying gas dispersing apparati. All of the apparati of the present invention have been based on the principal of using supersonic flow to provide a shock wave which generates extremely small bubbles (ranging from about 0.01 mm to about 1 mm in diameter) of the dispersing gas within a liquid. A shockwave can be achieved by injecting the dispersing gas at supersonic velocity into the mixture, by causing the dispersing gas-liquid composition to flow at supersonic velocity, or by combinations thereof. As previously discussed, the shockwave appears to be more intensive within the two phase flow of the gas-liquid mixture. Thus methods using at least sonic flow of the mixture to produce the shockwave are preferred. The small bubbles generated by the shock wave which occurs upon deceleration from supersonic (at least sonic) velocity to subsonic velocity provide increased surface area for mass transfer, for reaction, or for adhesion of particulates.

The preferred gas dispersing apparatus comprises an in-line venturi configuration, which enables acceleration of the gas-liquid composition linear velocity to supersonic while maintaining the desired pressure drop within the system.

Process variables such as residence time (flow rate or processing rate), temperature, pressure, initial component concentrations in the liquid and in the dispersing gas, and ratio of dispersing gas to liquid have been varied, to determine relationships between the variables and preferred operating ranges for a specific compositions and applications.

EXAMPLE 1

Figure 1:
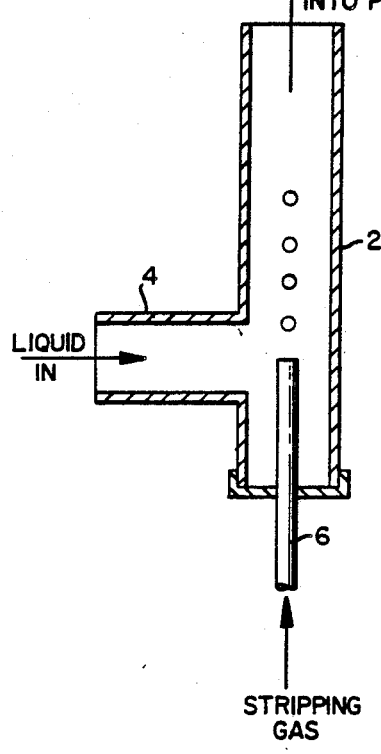
FIG. 1 shows a typical tee type gas-liquid mixing device of the kind known in the art. Gas is fed into a tube, the end of which is placed in a tee in the pipe through which the liquid flows.
Figure 2:
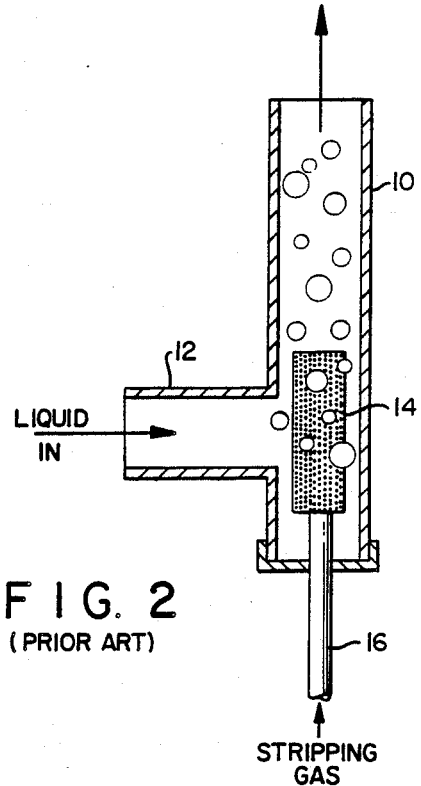
FIG. 2 shows a typical sparger type gas gas-liquid mixing device of the kind known in the art. Gas is fed into a porous metal diffuser which is placed in a tee in the pipe through which the liquid flows.
Figure 3:
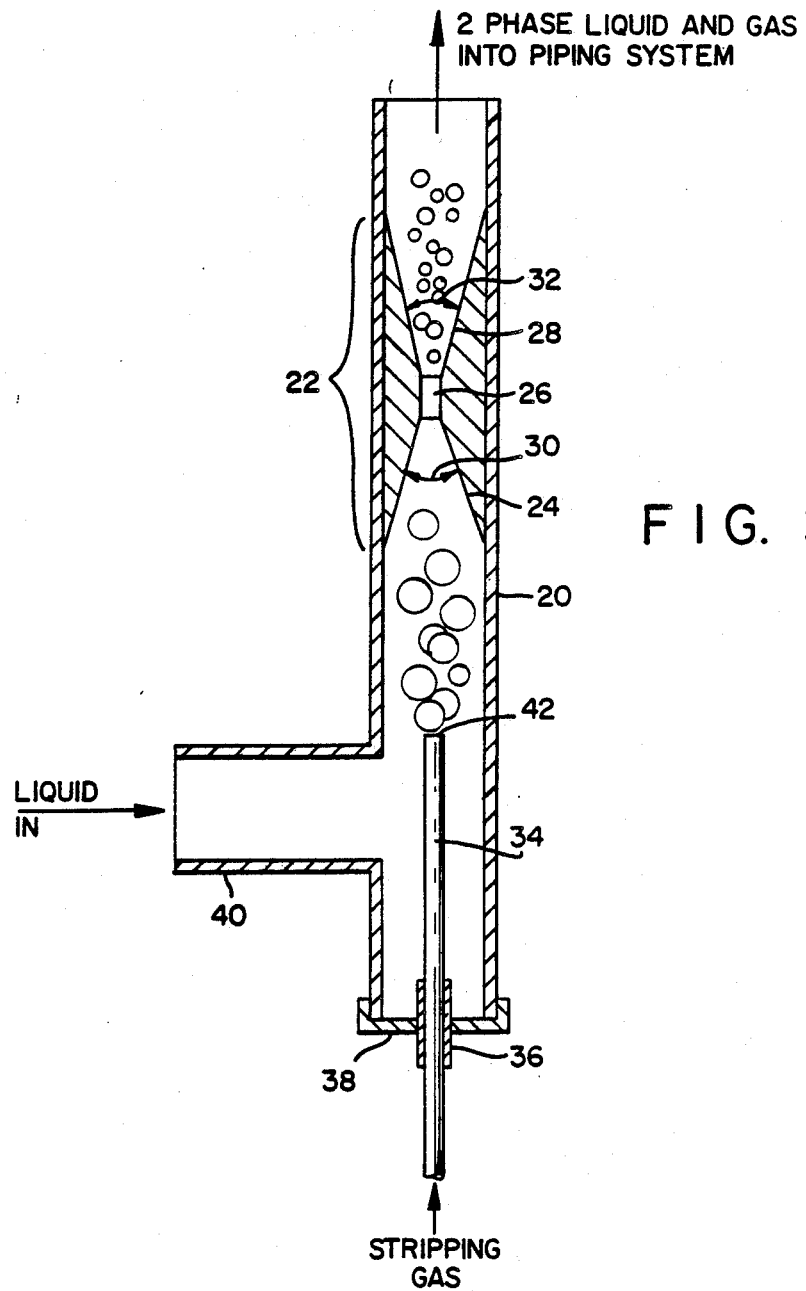
FIG. 3 illustrates a preferred in-line laboratory-sized gas dispersing device of the present invention, which combines an open tube through which stripping substance is fed into a liquid mixture or dispersion flowing in a pipeline with a venturi configuration which is used to accelerate the linear velocity of the gas liquid composition to a supersonic velocity.
Figure 4:
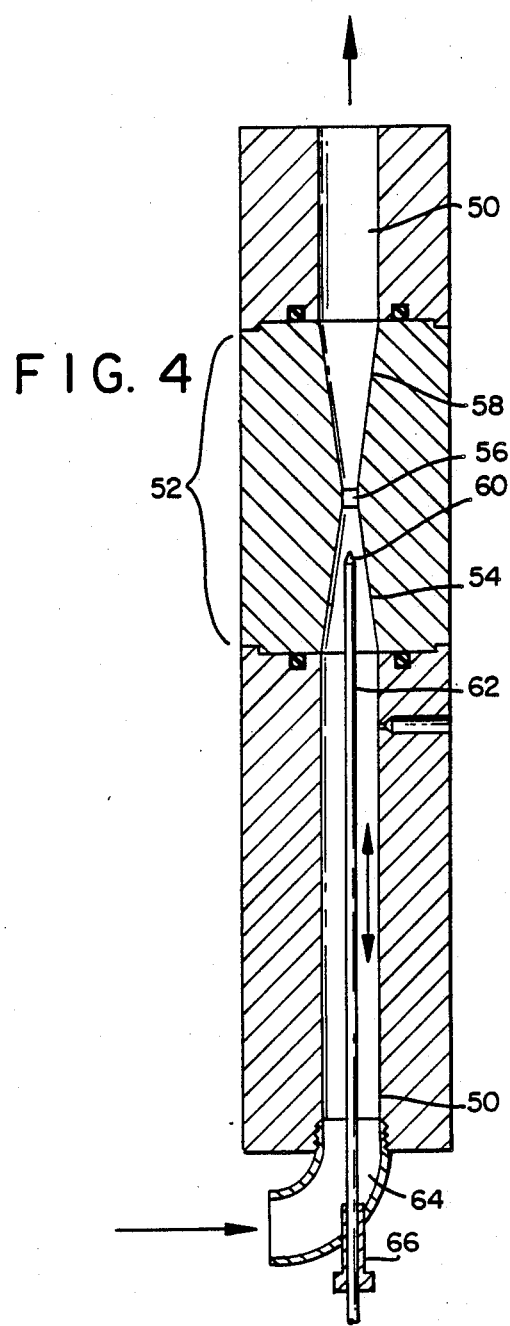
FIG. 4 depicts an in-line laboratory-sized gas dispersing device which combines a nozzle through which the dispersing gas is fed (at a subsonic or supersonic velocity) into a liquid, with a venturi configuration which is used to accelerate the linear velocity of the dispersing gas-liquid composition to a supersonic velocity.

Oxygen was stripped (removed) from room temperature water using several different in-line stripping devices: an in-line tee of the type shown in FIG. 1; an in-line sparger of the type shown in FIG. 2; an open tube feed of a stripping gas to a venturi configuration, shown in FIG. 3, and a pressurized nozzle feed of stripping gas to a venturi configuration, shown in FIG. 4. All of the in-line devices were placed in a pipeline having about 500 inches of length downstream of the in-line device, prior to the exit valve. The stripping gas used to strip the oxygen from the water was room temperature nitrogen having an initial oxygen content of about 1 ppm.

Figure 5:
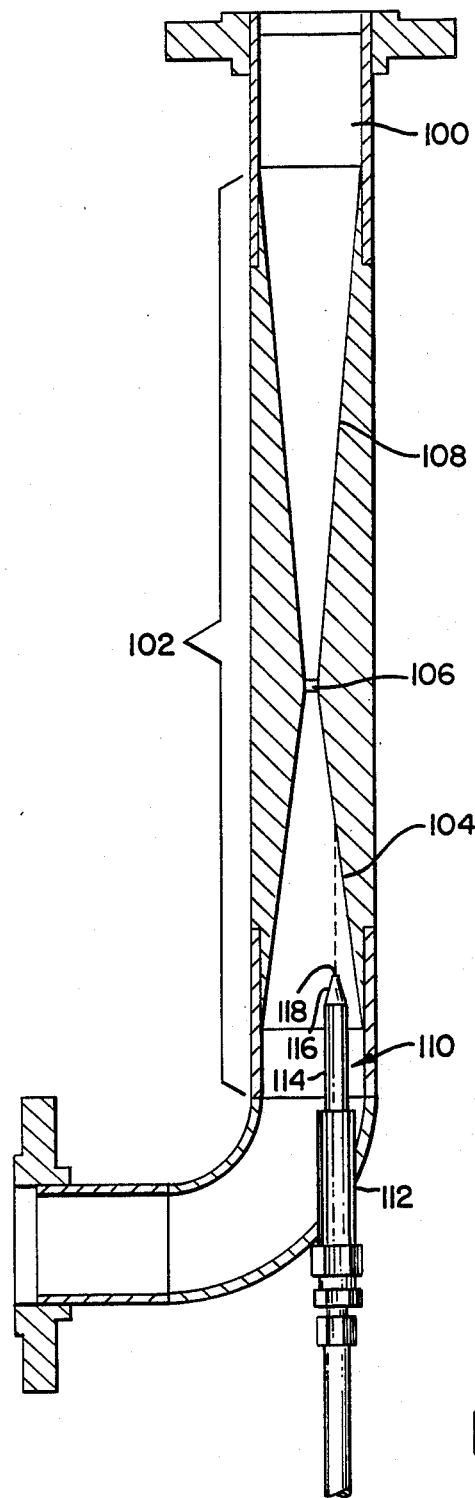
FIG. 5 is a schematic of a gas dispersing device similar to that shown in FIG. 4, but having the gas injection nozzle off-center to prevent channeling of the gas through the venturi throat. Although

Most recently, the stripping device configuration shown in FIG. 4 was modified to that shown in FIG. 5 wherein the pressurized nozzle for injecting stripping gas was positioned off-center from the venturi device center line, to prevent channeling of gas through the center of the liquid flow. It was discovered that when the injection velocity of the stripping gas is supersonic and the nozzle is located near the venturi throat, it is advantageous to position the nozzle away from the center line of the venturi throat and within the venturi compression cone. However, when the nozzle is positioned a distance upstream of the venturi throat, and prior to the compression cone entrance, it is advantageous to locate the nozzle so that it is centered relative to the venturi compression cone.

Figure 8:
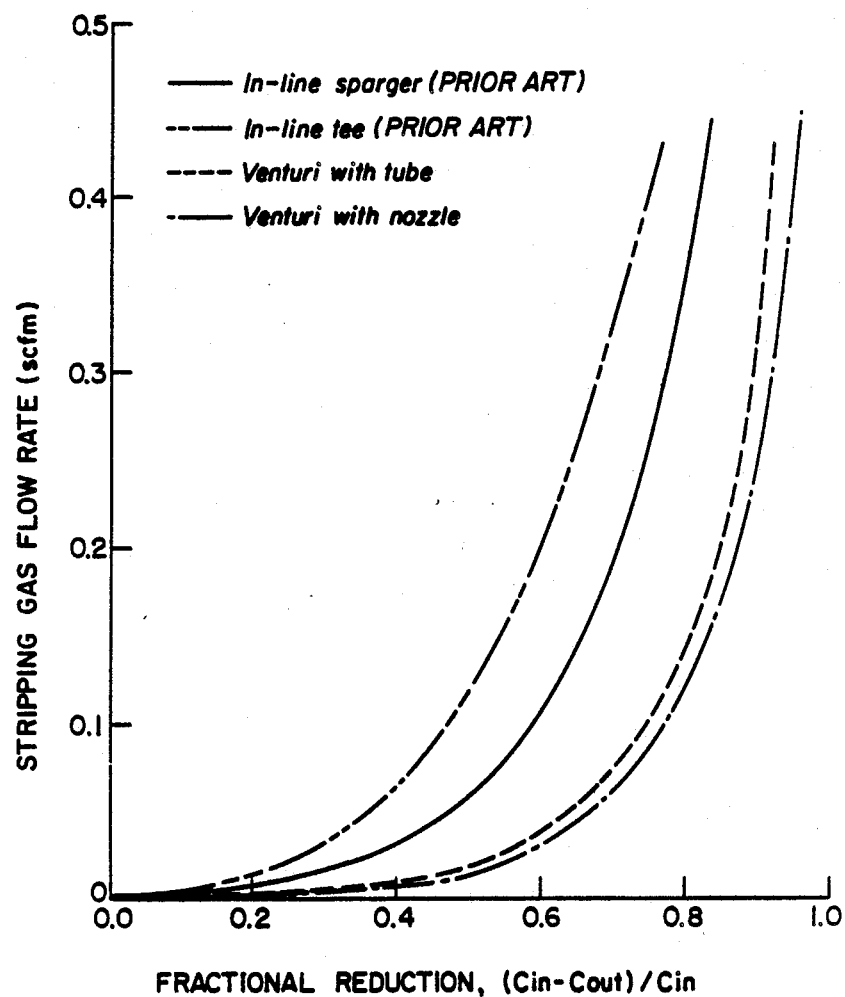
FIG. 8 shows a comparison of stripping gas consumption required to produce a given fractional reduction of the oxygen content of room temperature water for various types of in-line stripping systems.

As shown in FIG. 8, for stripping applications, given a constant stripping residence time, including residence time int the in-line stripping device and in downstream piping, the in-line sparger provides a significantly better fractional reduction in oxygen content of the water than the in-line tee. The two separation devices, preferred embodiments of the present invention, which comprise a venturi configuration to accelerate the fluid flow of a water-oxygen nitrogen composition to supersonic linear velocity, provide a substantial improvement in fractional reduction of oxygen content over both the in line tee and in line sparger.

Figure 9:
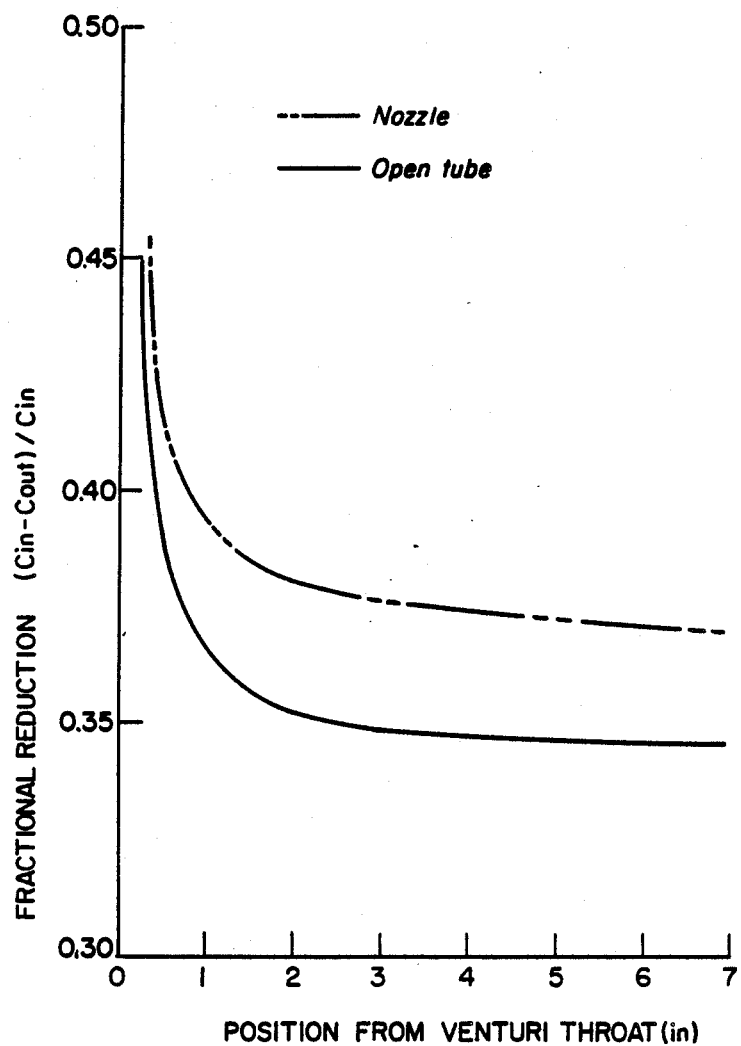
FIG. 9 shows a comparison of the fractional reduction of the oxygen content in room temperature water as a function of the type of in-line stripping device and the position of the stripping gas injector inside the device. In one case an open tube was used to feed stripping gas into an in line venturi configuration. In the second case, a high pressure nozzle was used to feed stripping gas into the in-line venturi configuration.

As shown in FIG. 9, a device comprising a venturi with high pressure nozzle stripping gas injector performs better than a device comprising a venturi with open tube injector. The venturi with nozzle device was particularly useful for removing oxygen from water when the initial concentration of oxygen in the water was particularly high.

Figure 10:
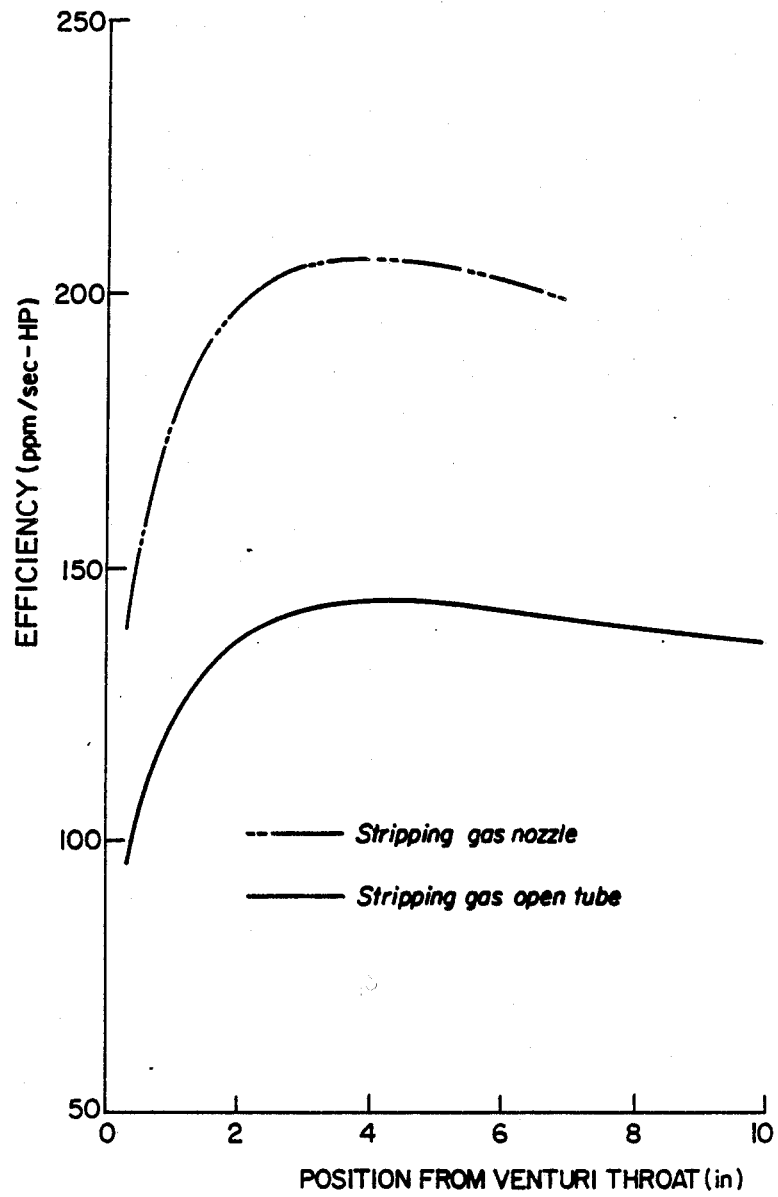
FIG. 10 shows the efficiency of the in-line stripping device as a function of the position of the stripping gas injector relative to the in-line venturi, for both the open tube injector and for the high pressure nozzle injector. The efficiency is expressed as the mass transfer coefficient, KLa (ppm/sec), divided by the power consumption in horsepower.

FIG. 10 shows that although the oxygen removal rate was increased for the open tube injector plus venturi by moving the tube closer to the venturi throat, the fractional reduction of oxygen achieved using the tube injector plus venturi was always less than that for the high velocity nozzle injector plus venturi, at any given nozzle position. It is believed the size of stripping gas bubbles generated by the sonic shock wave within the water-oxygen-nitrogen composition may directly proportional to the size of the nitrogen stripping substance bubble entering the flow accelerating device prior to the sonic shock wave. The bubble exiting the open tube was considerably larger than that exiting the high pressure nozzle. In addition, it is likely a tapered nozzle provides extra momentum or velocity to the centerline of the stripping gas velocity profile, thereby assisting in the production of a more extensive shockwave within the composition, and generating smaller bubbles in a more uniform distribution across the venturi device configuration.

The in line tee shown in FIG. 1 comprised a pipe 2 having an inside diameter of about 0.82 inches and a tee joined pipe 4 having an inside diameter of about 0.82 inches. Room temperature water saturated with about 9 ppm of oxygen was fed into tee joined pipe 4 at a pressure of about 4 to 8 psig at a volumetric flow rate of about 3 gal/min (gpm). Room temperature nitrogen stripping gas having an oxygen concentration of about 1 ppm was fed into pipe 2 through a tube 6 having an inside diameter of about 0.25 inches. Tube 6 was spaced concentrically inside pipe 2. The end of tube 6 was placed approximately at the center of the inlet from tee joined pipe 4 into pipe 2, as shown in FIG. 1. The pressure of the room temperature nitrogen in tube 6 was about 4 to 8 psig. The volumetric flow rate of nitrogen varied between about 0 standard cubic ft./min. (scfm) and about 0.5 scfm, as shown in FIG. 8. The residence time of the water-oxygen-nitrogen composition within the in-line device was about 0.25 seconds and the residence time in downstream piping prior to sampling the water for oxygen content (Cout) was about 13 seconds. The fractional reduction of oxygen within the water for various nitrogen flow rates is shown in FIG. 8. The fractional reduction of oxygen is equal to the oxygen concentration of the incoming water (Cin) minus the oxygen concentration of the processed water (Cout), measured at the end of the 500 inch long pipeline, the difference divided by the oxygen concentration of the incoming water (Cin). The data for the in-line tee of FIG. 1 is provided for comparison purposes only, since tee type gas liquid mixing systems are known in the art.

The in-line sparger arrangement shown in FIG. 2 comprised a pipe 10, having an inside diameter of about 0.82 inches and a tee joined pipe 12 having an inside diameter of about 0.82 inches. The sparging device 14 comprised a sintered metal cylinder with a porosity size of about 3 micrometers permitted gas flow out from within the cylinder. The sparging device 14 was positioned concentrically within pipe 10 so that about one half of the cylinder length extended on each side of the centerline of tee joined pipe 12, as shown in FIG. 2. Sparging device 14 was about 0.88 inches in length, having an outside diameter of about 0.5 inches. Room temperature water saturated at an oxygen concentration of about 9 ppm was fed into tee joined pipe 12 at a pressure of about 3 to 6 psig and at a volumetric flow rate of about 3 gpm. Room temperature nitrogen having an oxygen content of about 1 ppm was fed into sparging device 14 through an inlet tube 16. The nitrogen pressure in inlet tube 16 was less than about 40 psig, and the volumetric flow rate of the nitrogen was varied between about 0.0 and about 0.5 scfm as shown in FIG. 8.

The residence time of the water-oxygen-nitrogen composition within the in-line device and downstream piping prior to analysis for processed water oxygen content was about the same as for the in line tee. Oxygen was stripped from the incoming water by the nitrogen gas passing through the water. The fractional reduction in the oxygen concentration of the water at various nitrogen flow rates is shown in FIG. 8. This data is presented for comparison purposes only, as use of porous metal spargers to mix gas into a liquid is considered to be known in the art.

Figure 11:
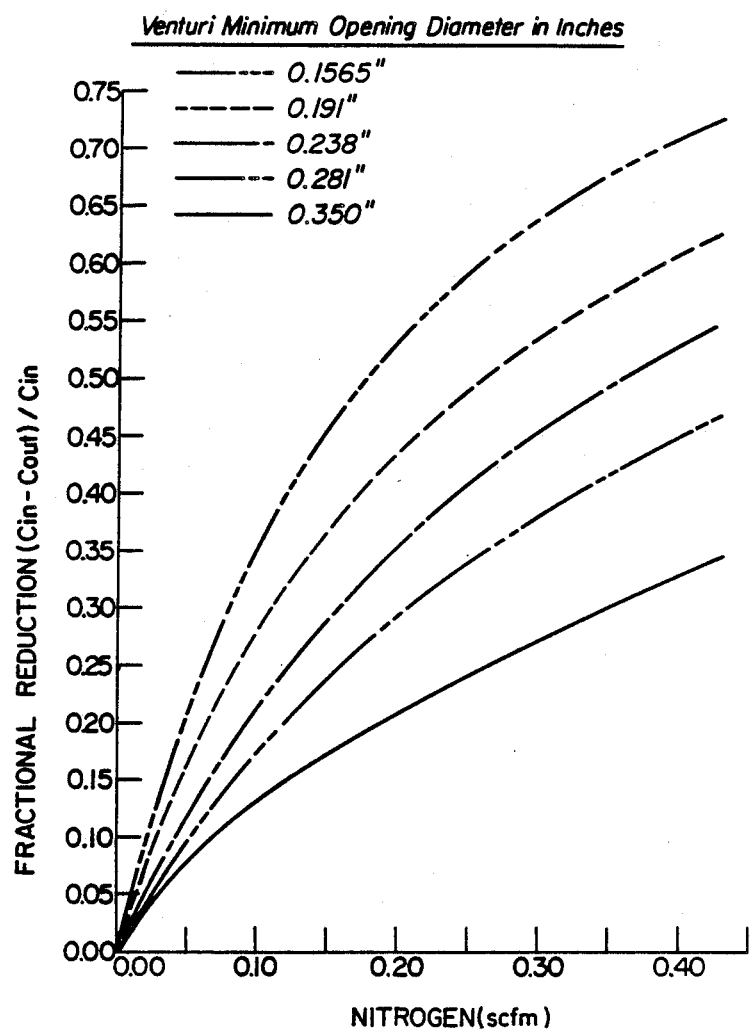
FIG. 11 shows the fractional reduction of oxygen in water as a function of stripping device venturi throat size at varying stripping gas (nitrogen) volumetric feed rates.

In accordance with the present invention, the in-line separation device shown in FIG. 3 comprised a pipe 20 about 0.82 inches in inside diameter, fitted with a venturi configuration 22 having a compression cone 24, a throat 26 and an expansion cone 28. The included angle 30 of compression cone 24 was about 21 degrees. The throat 26 was about 0.16 inches in diameter, having a throat length of about 0.16 inches. The included angle 32 of expansion cone 28 was about 15 degrees. Upstream of venturi configuration 22 was an open tube 34 which was positioned concentrically in the center of tube 20 through a sleeve 36 which extended through a cap 38 on the end of tube 20. A tee joined tube 40 extended from tube 20 upstream of venturi device 22 at a location near the entrance of open tube 34, as shown on FIG. 3. Open tube 34 had an inside diameter of about 0.18 inches and open tube 34 could be moved within sleeve 36 so that the position of the end 42 of tube 34 could be moved relative to venturi configuration 22. The position of the end 42 of tube 34 was about 7 inches from the beginning of venturi throat 26 at the time the data presented in FIG. 8 was gathered. At this location, the end 42 of tube 34 was upstream of the beginning of compression cone 24 by about 5.2 inches. Subsequent data has demonstrated the venturi with open tube device of FIG. 3 would have performed even better had the end 42 of tube 34 been positioned within compression cone 24. Room temperature water at a saturated oxygen concentration of about 9 ppm was fed into tee joined pipe 40 at a pressure of about 16 to 35 psig and at a volumetric flow rate of about about 3 gpm. Room temperature nitrogen having an oxygen concentration of about 1 ppm was fed through open tube 34 into pipe 20. The pressure in open tube 34 was less than about 40 psig, and the volumetric flow rate of nitrogen was varied between about 0.0 and about 0.5 scfm as shown in FIG. 8. Oxygen was stripped from the incoming water by the nitrogen gas passing through the water. The water-nitrogen composition downstream of open tube 34 was passed through venturi configuration 22 so that the linear velocity of the composition exiting venturi throat 26 ranged from about 50 ft/sec at zero nitrogen flow to about 112 ft/sec at 0.5 scfm of nitrogen flow. Depending on the nitrogen gas fraction of the water-oxygen-nitrogen composition, linear velocities as low as 50 ft/sec can provide theoretical supersonic velocity for the composition. The fractional reduction in the oxygen concentration of the water at various nitrogen flow rates is shown in FIG. 11. It is surprising to find such an improvement in fractional reduction for the venturi with tube over the prior art devices at nitrogen flow rates as low as 0.01 scfm. One would not have expected the improvement observed without supersonic flow of the water-oxygen-nitrogen composition in the tube-venturi device. Yet, the calculated average linear velocity of the composition based on the data of Kieffer is below supersonic. This unexpected improvement in performance is attributed to the concept, previously discussed, that it is possible to have supersonic velocity at a particular point in the fluid flow profile within the device but not at another. Thus, the average linear velocity may be below theoretical supersonic flow, but a sonic shockwave may occur at point locations within the flow profile. Of course optimum device performance occurs when the average linear velocity is at least sonic.

Figure 4A:
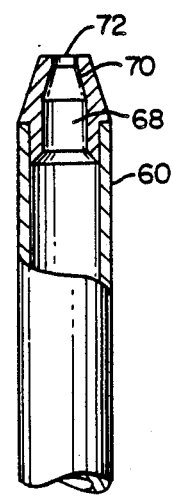

In accordance with the present invention, the in-line separation device shown in FIG. 4 comprised a pipe 50 about 0.82 inches in inside diameter, fitted with a venturi configuration 52 having a compression cone 54, a throat 56, and an expansion cone 58. The included angle of compression cone 54 was about 34 degrees. The throat 56 was about 0.19 inches in diameter, having a throat length of about 0.36 inches. The included angle of expansion cone 58 was about 35 degrees. Upstream of venturi throat 56 was a nozzle section 60 extending from tube 62. Tube 62 was positioned concentrically in the center of pipe 50. During the early period of experimentation, tube 62 extended through a sleeve into an open housing area. The open housing area had an entering pipe and an exiting pipe, each about 0.82 inches in diameter; the center lines of the two pipes being at right angles, with the housing connecting them. Tube 62 extended through the housing with its centerline concentric to venturi throat 56. Subsequent to early work, including Example 1, the housing section and entering pipe were replaced with a 90 degree long elbow 64 as shown in FIG. 4. Sleeve 66 extended through elbow 64 so that tube 62, including nozzle section 60 could be moved relative to venturi configuration 52. The inside diameter of pipe 50 entering and the inside diameter of elbow 64 were about 0.82 inches. Nozzle section 60 comprised an entrance inside diameter 68 of about 0.13 inches. A conical section 70 joined the entrance portion of the nozzle to the exit opening 72 which was about 0.063 inches in diameter. The details of nozzle section 60 are shown in FIG. 4A.

Room temperature water at a saturated oxygen concentration of about 9 ppm was fed into the entrance pipe through the open housing into pipe 50. The pressure in pipe 50 upstream of venturi configuration 52 was about 15 to 36 psig (15 psig at no nitrogen flow), at a volumetric flow rate of about 3 gpm. The pressure in pipe 50 upstream of venturi configuration 52 was reduced by about 3 to 6 psig at the volumetric flow rate of about 3 gpm with the benefit of elbow 64 in place, as shown in FIG. 4. Room temperature nitrogen having an oxygen content of about 1 ppm. was fed through tube 62 into nozzle 60 at a pressure less than about 40 psig in tube 52 and at a volumetric flow rate ranging from about 0.0 to about 0.5 scfm as shown in FIG. 8. The line pressure downstream of venturi configuration 52 typically ranged from about 5 to about 10 psig. Oxygen was stripped from the incoming water by the nitrogen gas passing through the water by nitrogen gas passing through the water. The water-oxygen nitrogen composition downstream of nozzle 60 was passed through venturi configuration 52 so that the velocity of the composition exiting venturi throat 56 ranged from about 50 ft/sec at zero nitrogen flow to about 112 ft/sec at 0.5 scfm nitrogen flow. As previously discussed, theoretical supersonic velocity for the composition can occur within this range. The residence time of the water-oxygen-nitrogen composition was about 0.25 seconds in the in-line device and about 13 seconds in downstream piping, as previously described. The fractional reduction in oxygen concentration in the water at various nitrogen flow rates is shown in FIG. 8.

The FIG. 8 fractional reduction in oxygen content =

(Cin Cout)/Cin, wherein Cin = initial oxygen concentration in the water entering the in-line device, and Cout = oxygen concentration in the water, at the end of the 500 inch length of piping previously discussed.

A single pass of the room-temperature water through the venturi with nozzle device provided a fractional reduction of about 0.94 at a flow rate of about 0.4 scfm nitrogen. Thus, the oxygen concentration was reduced from about 9 ppm to about 0.5 ppm. This compares with the venturi with open tube device which provided a reduction from about 9 ppm to about 1.0 ppm at the same nitrogen flow rate. The in-line sparger of the type shown in FIG. 2, provided an oxygen concentration reduction from about 9 ppm to about 1.6 ppm at the 0.4 scfm nitrogen flow rate, and the in line tee provided a reduction from about 9 ppm to about 2.2 ppm. As indicated in FIG. 8, the nitrogen usage rate becomes asymptomatical as the fractional reduction in oxygen content approaches 1. Thus, there is a point of diminishing returns for increased nitrogen usage in a single pass removal of oxygen at a given residence time.

EXAMPLE 2

FIG. 9 shows the effect of nozzle or open tube injector position relative to the venturi throat. For any given position from the venturi throat, the high velocity nozzle provides a better oxygen fractional reductions all other variables being substantially equivalent. This phenomenon is attributed to the smaller nitrogen bubble size leaving the nozzle as compared with the bubble size leaving the open tube and the increased linear velocity of the nitrogen at the center of the nozzle flow profile, as previously discussed.

The data presented in FIG. 9 was generated using the open tube with venturi stripping device of FIG. 3 and the nozzle with venturi stripping device of FIG. 4, except that the open housing was present in the liquid flow line rather than the long 90° elbow shown in FIG. 4. Oxygen was stripped from room temperature water saturated at about 9 ppm of oxygen, using nitrogen having an oxygen content of about 1 ppm. The residence time in stripping device was about 19 seconds, including the residence time in the 500 inches of piping. The water flow rate was about 3 gpm, at a pressure ranging from about 22 to 34 psig upstream of the stripping device, depending on the position of the nozzle relative to the venturi throat. The nitrogen flow rate was about 0.08 scfm at a pressure of less than about 40 psig in the tube leading to the open end exit or leading to the nozzle exit.

The principal limiting factor in tube or nozzle location is the pressure drop across the system, measured as differential pressure across the inlet and outlet to the in line device. The pressure drop increases as the tube or nozzle is moved closer to the venturi throat. The increase in pressure drop across the in-line tripping device is evidenced by the increased pumping power requirements necessary to maintain a given volumetric throughput rate for the liquid mixture.

FIG. 10 shows one measure of the stripping efficiency for an in-line device. Efficiency, expressed as mass transfer rate divided by pumping horsepower, is shown as a function of the stripping substance injection position relative to the venturi device throat entrance.

For the system described in this example, the pressure drop across the tube with venturi device, with the tube end 42 positioned about 2 inches upstream of the entrance to venturi throat 26 was about 16 psi. This compared with a pressure drop of about 19 psi when tube end 42 was placed about one inch from the entrance to throat 26, compared with a pressure drop of about 23.5 psi when tube end 42 was placed about 0.5 inches from the entrance to the venturi throat 26. Pressure drops across the nozzle plus venturi device were about 16.5 psi when the nozzle was positioned about 2 inches from the entrance to venturi throat 26, about 20 psi when nozzle end 72 was positioned about one inch from venturi throat 26, and about 24 psi when nozzle end 72 was positioned about 0.5 inches from venturi throat 26. One skilled in the art desiring to use the present invention would consider the acceptable pressure drop (or cost of recovering pressure) in determining the practical location of the stripping substance injector relative to the entrance to the venturi throat. It is apparent from FIG. 10 that for a given throughput rate and liquid mixture stripping gas composition, there is an optimum tube or nozzle position relative to the venturi configuration, in terms of stripping efficiency.

Pressure drop can be reduced by increasing the venturi throat or minimum opening diameter or by reducing the diameter of the injector relative to the venturi throat or minimum opening diameter. This permits the injector to be positioned closer to the venturi throat or minimum opening diameter while holding the pressure drop constant.

Pressure drop across the in-line device of the present invention also increases with increased loading of stripping gas in the stripping gas-liquid composition.

Another factor which must be taken into account in determining overall system efficiency is the amount of stripping substance consumed to provide the reduction in concentration of the gas initially present in the liquid which is being removed from the liquid.

EXAMPLE 3

Another important variable affecting the size of stripping gas bubbles formed, and thus mass transfer rate of the initially present gas to be removed from the liquid to the stripping gas, is the minimum diameter opening of the venturi device. This may be the venturi throat diameter or the diameter of the opening between the compression cone and the expansion cone. FIG. 11 shows the fractional reduction in oxygen content of room temperature water at various nitrogen flow rates, as a function of the minimum opening diameter (throat diameter in this case) of the venturi device.

The data shown in FIG. 11 were generated using a venturi with nozzle type device similar to that shown in FIG. 4. Five different venturi configurations, each with a different throat diameter were evaluated. The length of each venturi throat was the same as its diameter. The compression cone and expansion cone included angles remained as previously described. The incoming room temperature water, oxygen concentration was about 10 ppm and the pressure in pipe 50 upstream of the stripping device ranged from about 19 psig at zero nitrogen flow for the smallest diameter throat to about 10 psig at zero nitrogen flow for the largest diameter throat. The water volumetric flow rate was about 3 gpm. The room temperature nitrogen stripping gas oxygen content was about 1 ppm. Pressure in the nitrogen containing tube upstream of the nozzle was varied as necessary to obtain the desired nitrogen flow rate in scfm. As shown in FIG 11, for a given nitrogen flow rate, a decrease in venturi throat diameter increases the fractional reduction in oxygen content of the water.

Some of the larger venturi throat sizes shown in FIG. 11 were designed to provide slightly less than theoretical subsonic linear flow velocity. For example, at a nitrogen volumetric flow:water volumetric flow of 1:1, and a water flow rate of about 3 gpm, the linear velocity of the water-oxygen-nitrogen composition through the largest throat diameter is about 20 ft/sec. This compares with 100 ft/sec for the smallest throat diameter at the same volumetric flow rates. Although the fractional oxygen reduction curves for the larger throat diameter do not follow the same shaped path as the curves for the smaller throat diameters, the clear performance distinction expected for theoretical subsonic flow compared with theoretical supersonic flow did not appear. It is believed each venturi configuration may generate supersonic flow along some flow paths within the configuration but not along others; Thus, although there was not supersonic flow across the entire device profile, there were localized shock waves in specific locations at which supersonic flow was achieved. As a result the oxygen removal achieved was better than expected.

For example, the calculated average linear flow velocity may be subsonic, but the velocity profile across the venturi throat is not constant due to wall effects, etc. and the linear velocity at the center of the profile may be supersonic.

Figure 12:
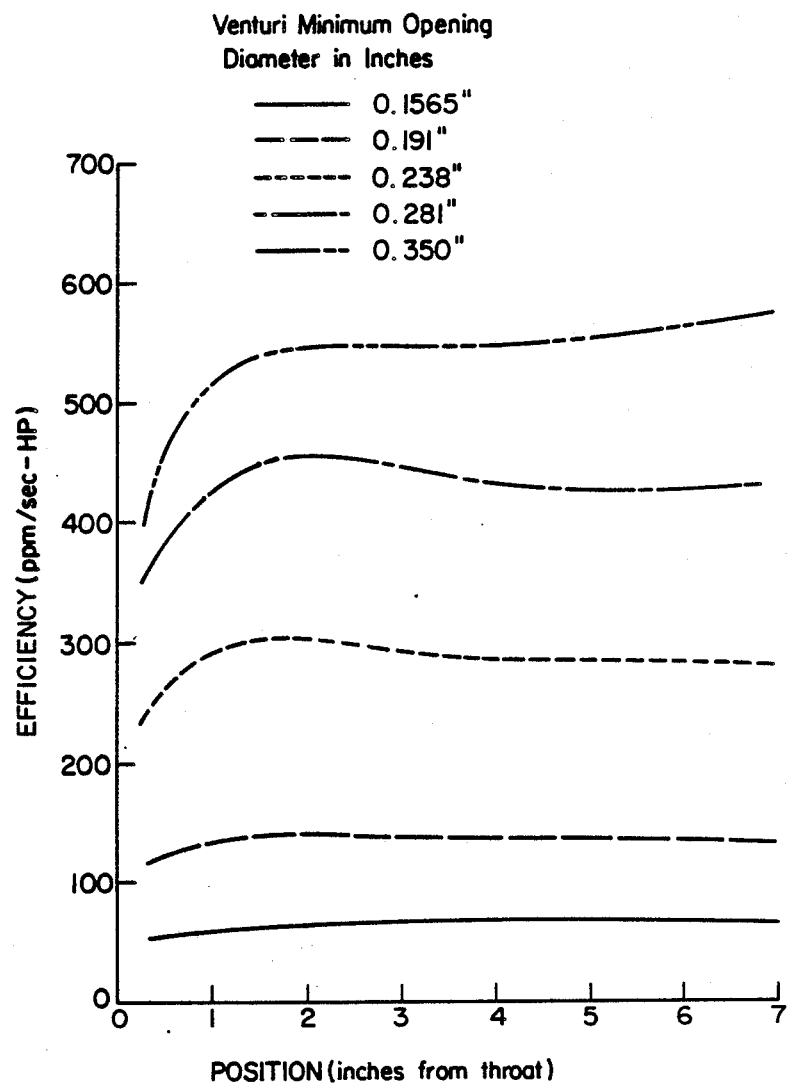
FIG. 12 shows the efficiency of the in-line stripping device used to produce the data shown in FIG. 11, as a function of venturi throat size.
Figure 13:
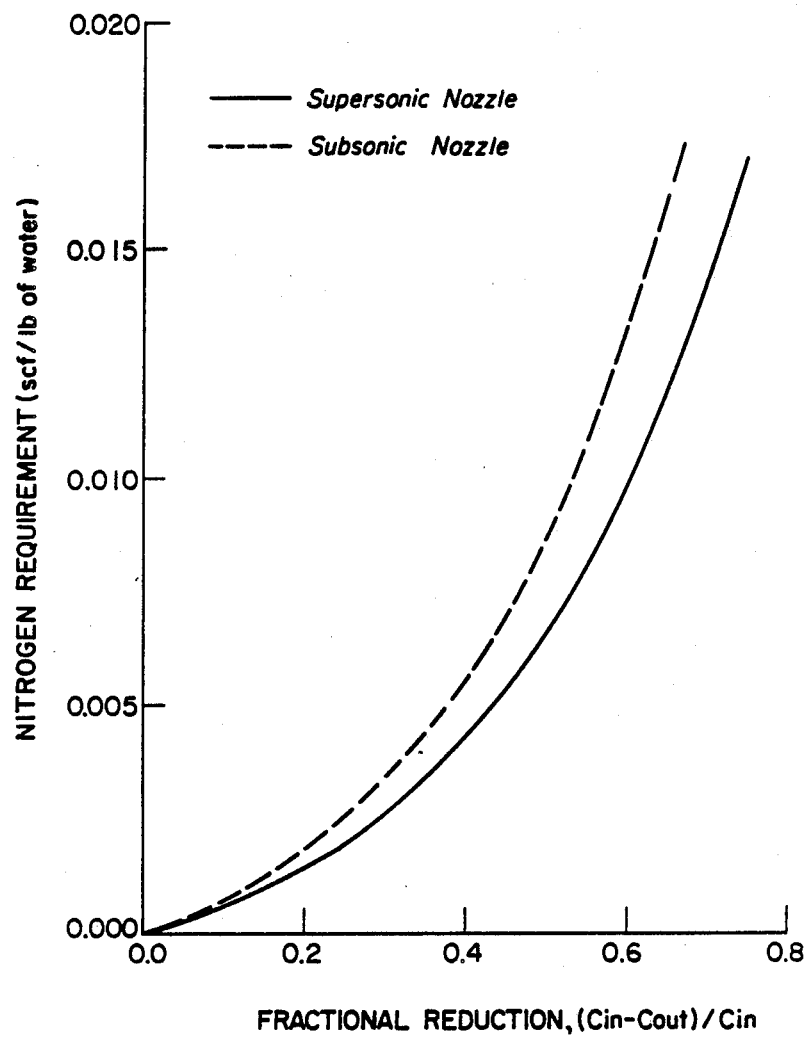
FIG. 13 shows a comparison of the stripping gas (nitrogen) consumption per pound of liquid mixture (water and oxygen) to provide various oxygen fractional reductions (using a nozzle venturi device of the type shown in FIG. 4), as a function of linear velocity of the stripping substance (nitrogen) exiting the injection nozzle.

FIG. 12 shows the stripping efficiency corresponding to FIG. 11, as mass transfer rate divided by pumping horsepower, as a function of venturi throat size. There is an optimum venturi throat size for a given stripping application.

Reviewing the apparatus variables, then, for a given procesed liquid, having a given residual concentration of the initially present gas, both the injector position relative to the minimum venturi opening, and size of the opening itself must be carefully considered in designing the separation device. These apparatus variables must be balanced against the amount of stripping substance consumed.

EXAMPLE 4

Figure 18:
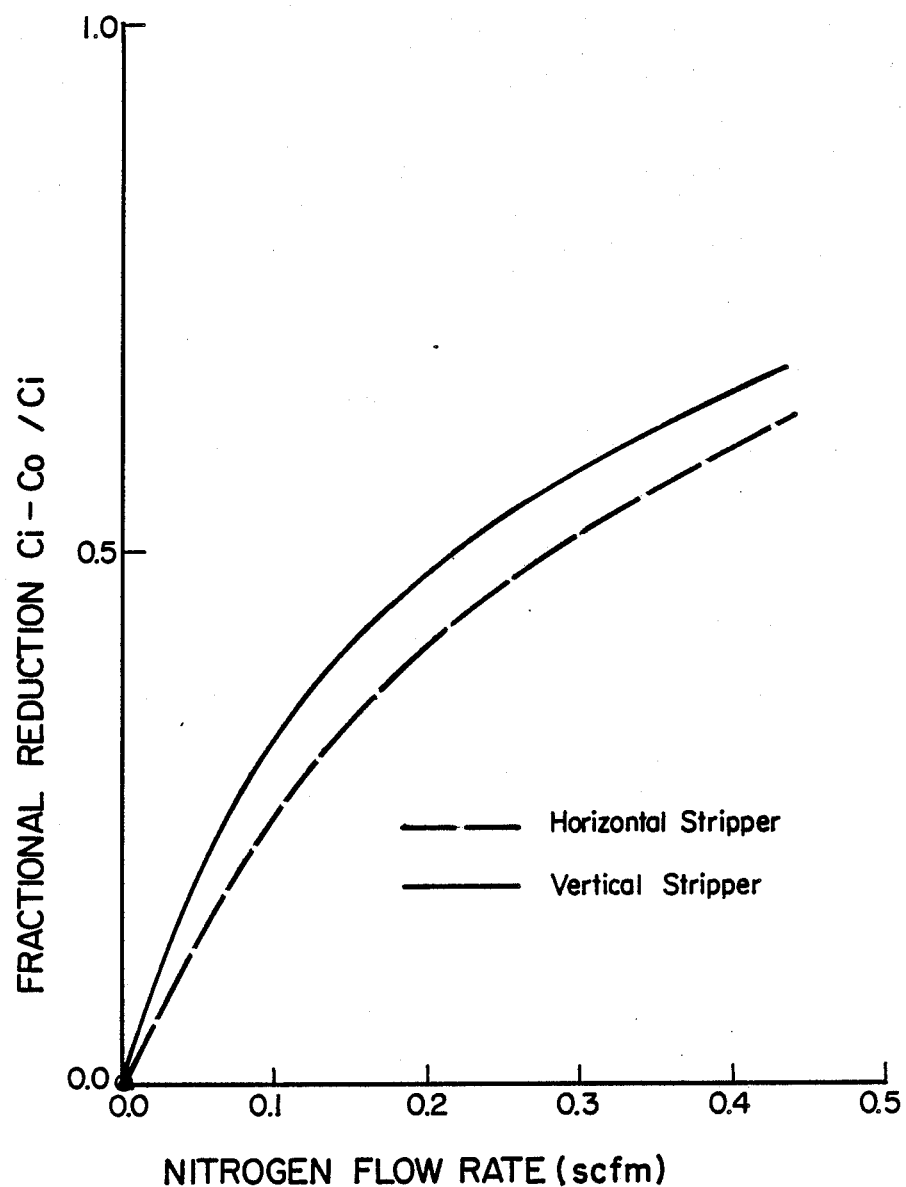
FIG. 18 shows the effect of vertical or horizontal orientation of the gas dispersion apparatus in a pipeline. The specific data is for stripping of oxygen from room temperature water.

When a pipeline gas dispersion device is used, experimentation has shown that vertical orientation of the dispersion device in the pipeline is advantageous. FIG. 18 shows the improvement in the fractional reduction of oxygen content in water when a vertical orientation is used as opposed to a horizontal orientation. The improved performance is attributed to the buoyancy force of injected gas enhancing the acceleration of the gas-liquid mixture through the accelerating configuration.

In a case where the pump which pumps gas-liquid mixture through the pipeline has marginal capacity, the assistance provided by vertical orientation of the gas dispersing apparatus in the pipeline can be significant.

EXAMPLE 5

This example and several which follow are intended to illustrate the potential wide range of applications for which the method and apparatus of the present invention can be used. It is not intended that these examples be limiting, since one skilled in the art can, with minor modifications, use the invention for so many different applications.

Figure 19:
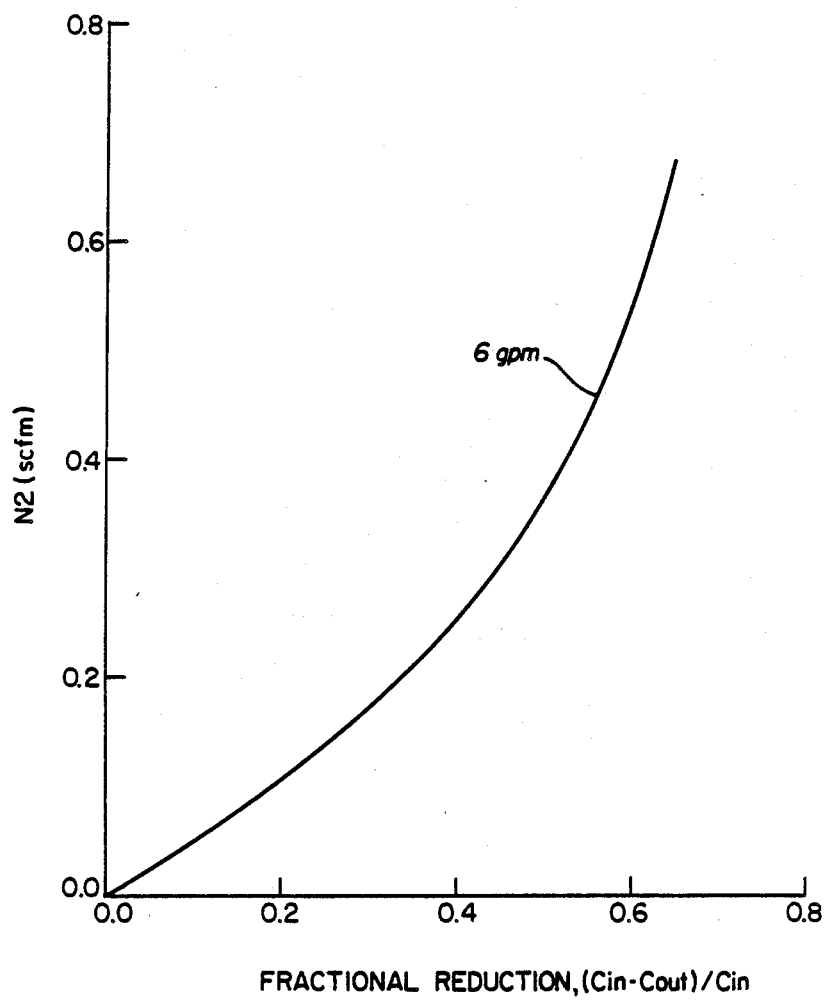
FIG. 19 shows volumetric nitrogen stripping gas requirements, in scfm, to achieve various oxygen

Oxygen was separated from refined soybean oil using a nitrogen stripping gas in the stripping apparatus shown in FIG. 4. The fractional reduction of oxygen content in the soybean oil as a function of nitrogen stripping gas flow rate is shown in FIG. 19. The nitrogen injection nozzle was positioned about 0.25 inches upstream of the venturi throat, which was about 0.19 inches in diameter. The initial oxygen content of the soybean oil was about 37 ppm. The initial oxygen content of the room temperature nitrogen stripping gas was about 1 ppm. When the soybean oil processing temperature was about 33° C., the soybean oil flow rate was about 6 gpm, and the nitrogen flow rate was about 0.38 scfm, a single pass through the stripping device decreased the oxygen content from the about 37 ppm to about 19 ppm. After separation of the oxygen saturated nitrogen stripping gas from the soybean oil using gravity, a second pass through the stripping device (under the same operating conditions) reduced the oxygen content in the soybean oil from the about 19 ppm to about 10 ppm.

When the soybean oil processing temperature was about 45° C., the soybean oil flow rate was about 6 gpm, and the nitrogen flow rate was about 0.66 scfm, a single pass through the stripping device decreased the oxygen content from the about 37 ppm to about 11 ppm. A second pass through the device, after separation as described above, reduced the oxygen content in the soybean oil from the about 11 ppm to about 3.6 ppm.

The amount of nitrogen required to obtain a given fractional reduction in oxygen content of the soybean oil is considerably higher than that required for the same oxygen fractional reduction in water. Compare FIG. 19 with FIG. 8. This is because the soybean oil is a highly viscous liquid which reduces the oxygen diffusion rate from the 0.1 into the nitrogen stripping gas. In addition, the initial oxygen saturation concentration in soybean oil is about 4 times greater than the oxygen saturation in water at the same temperature. Nitrogen consumption is affected by the initial oxygen content of the soybean oil, the initial oxygen content of the nitrogen, the oil-nitrogen composition flow rate through the stripping device, and the composition temperature.

It has been discovered that the achievable fractional reduction can be increased by increasing the temperature of the liquid mixture to be stripped, as demonstrated herein. Although the solubility of the oxygen in the soybean oil increases with temperature, the increase in oxygen diffusion rate from the oil into the nitrogen stripping gas more than compensates for changes in oxygen solubility.

Since it was not possible to achieve a fractional reduction in oxygen content greater than about 0.7 without undue pressure drop across the in-line device and without using undue amounts of nitrogen stripping gas, multiple stage stripping with separation of the stripping gas from the oil after each stage were used, as described above, to obtain oxygen fractional reductions up to about 0.9.

EXAMPLE 6

Figure 20:
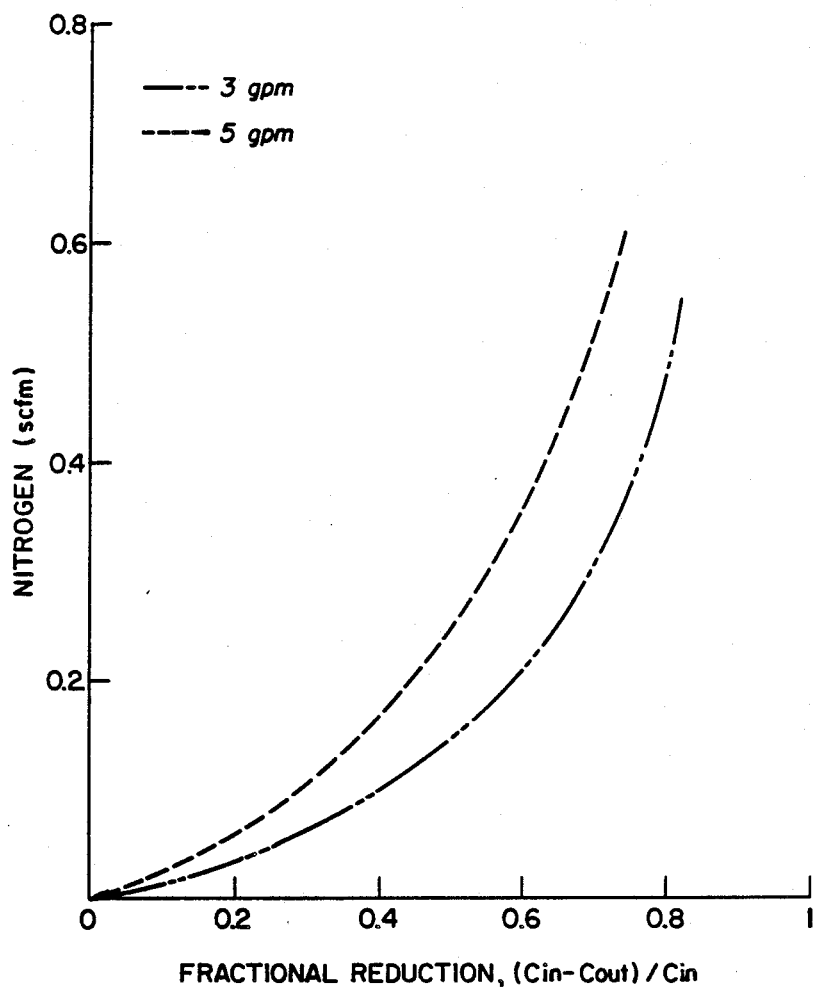
FIG. 20 shows volumetric nitrogen stripping gas requirements, in scfm, to achieve various oxygen fractional reductions in corn oil (using a single stage nozzle venturi stripping device of the type shown in FIG. 4), as a function of the volumetric flow rate of the corn oil.

Oxygen was removed from crude corn oil using the stripping apparatus shown in FIG. 4. The fractional reduction of oxygen content in the corn oil as a function of nitrogen stripping gas flow rate and corn oil flow rate is shown in FIG. 20. The nitrogen injection nozzle position and venturi throat diameter were the same as in EXAMPLE 4. The initial oxygen content of the corn oil was about 38 ppm. The initial oxygen content of the room temperature nitrogen stripping gas was about 1 ppm. The corn oil processing temperature was about 30° C.

Figure 21:
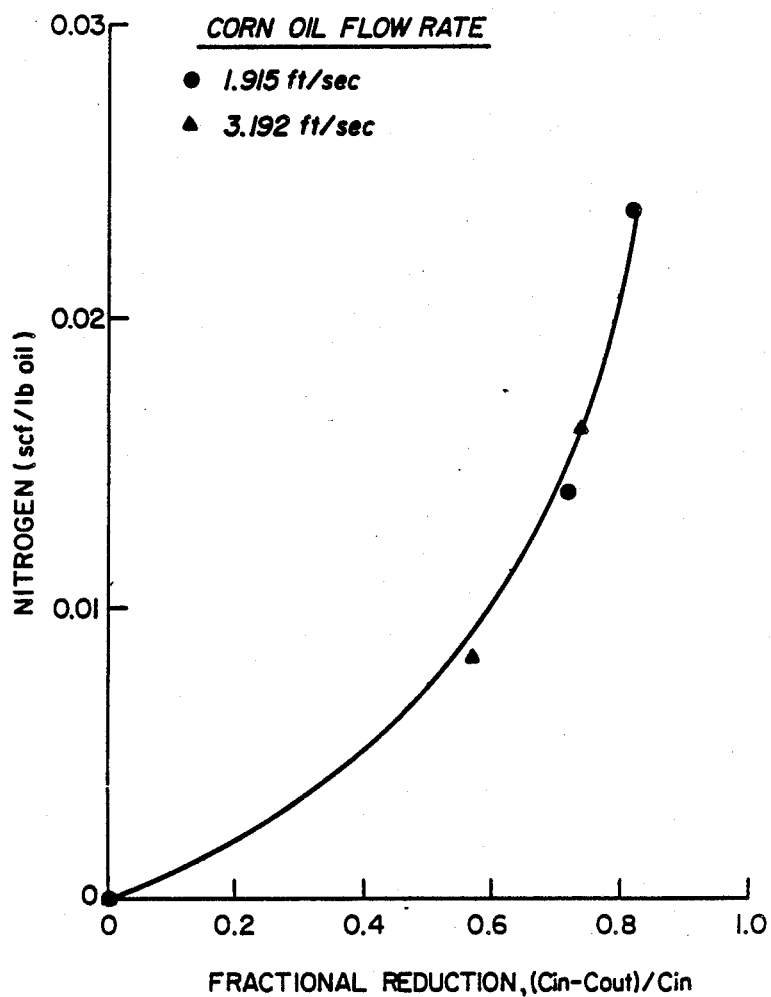
FIG. 21 shows nitrogen stripping gas consumption per pound of corn oil to achieve various oxygen fractional reductions (for a single stage nozzle-venturi device of the type shown in FIG. 4), as a function of linear velocity of the nitrogen-corn oil composition through the in-line device.

It was discovered, as shown in FIG. 21, that the oxygen fractional reduction achievable is independent of the linear velocity of the corn oil-nitrogen composition through the venturi configuration, so long as the composition linear velocity is supersonic and the total residence time for the in-line device and downstream piping is at least 5 seconds.

EXAMPLE 7

The in-line stripping device shown in FIG. 4 was used to remove oxygen from an aqueous solution of ethyl carboxycellulose. The end of the nitrogen injection nozzle 70 was positioned about 0.25 inches upstream of the venturi throat which was about 0.19 inches in diameter and 0.36 inches in length.

The concentration of ethyl carboxycellulose in the solution ranged from about 0.15 per cent by weight (having a room temperature viscosity of about 5 cps) to about 0.42 per cent by weight (having a room temperature viscosity of about 53 cps). The initial, saturated oxygen content of a typical room temperature ethyl carboxycellulose solution was about 8 ppm. The initial oxygen content of the room temperature nitrogen stripping gas was about 1 ppm. The volumetric solution flow rate was varied from about 3 to about 5 gpm and the volumetric nitrogen stripping gas flow rate was varied from about 0.025 scfm to about 0.26 scfm.

Figure 22:
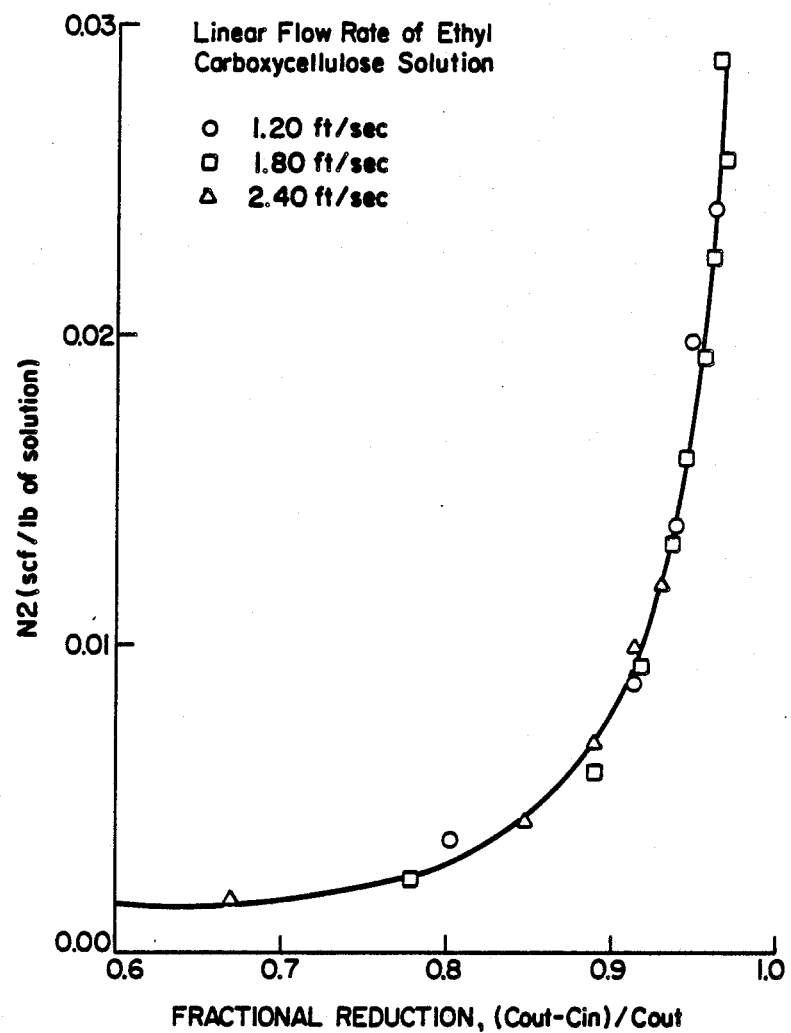
FIG. 22 shows nitrogen stripping gas consumption per pound of ethyl carboxycellulose solution to achieve various oxygen fractional reductions (for a single stage nozzle-venturi device of the type shown in FIG. 4), as a function of linear velocity of the nitrogen-ethyl carboxycellulose solution composition through the in-line device.

FIG. 22 shows the fractional reduction in oxygen content of an ethyl carboxycellulose solution as a function of nitrogen stripping gas loading and linear velocity of the solution-stripping gas composition through the in-line stripping device.

The oxygen removal was carried out in a steady state, single stage stripping operation using an in line device of the type shown in FIG. 4. The pipe size was about 0.82 inches in internal diameter, and the Cout oxygen concentration measurement was made downstream of the in-line stripping device, after 500 inch length of pipe. The system temperature was about 18° C. and the viscosity of the ethyl carboxycellulose solution was about 5.5 cps.

The fractional reduction in oxygen concentration as a function of nitrogen stripping gas loading was studied at gas loadings as high as 160 per cent by volume. No phase separation was found at the 160 per cent by volume nitrogen stripping gas loading in an ethyl carboxycellulose solution having a viscosity of about 53 cps, at about 27° C.

EXAMPLE 8

In accordance with the present invention, the in-line gas dispersion device shown in FIG. 5 comprises a pipe 100 which is 1½ inch diameter schedule 40 stainless steel pipe (about 1.6 inches in internal diameter). The pipe is fitted with a venturi configuration 102 having a compression cone 104, a throat 106 and an expansion cone 108. The included angle of compression cone 104 is about 10.5 degrees. The throat 106 is about 0.36 inches in diameter and about 0.10 inches in length. The included angle of expansion cone 108 is about 7.5 degrees. Upstream of venturi throat 106 is a nozzle section 110 extending from sleeve 112. Sleeve 112 is welded in place off-center from the venturi configuration as shown in FIG. 5. Nozzle section 110 can be moved within sleeve 112 so that it extends along the dotted path line toward the wall of compression cone 104. Nozzle section 110 comprises an entrance section 114 having an inside diameter of about 0.30 inches. A conical section 116 joined to entrance section 114 is tapered at an included angle of about 17 degrees. The tip 118 of nozzle section 110 has an inside diameter of about 0.04 inches and typically the tip section extends from tapered section 116 for a distance of about 0.03 inches. The type of device shown in FIG. 5 permits the operator to adjust the nozzle position as necessary to obtain optimized performance for a given application of the gas dispersion system. This device has been fabricated and used in evaluation experiments During the initial evaluation of the concepts related to use of an off center nozzle, however, the gas dispersion device shown in FIG. 4 was used with a bend in tubing 62 to permit positioning of nozzle 60 off-center from venturi throat 56.

Figure 14:
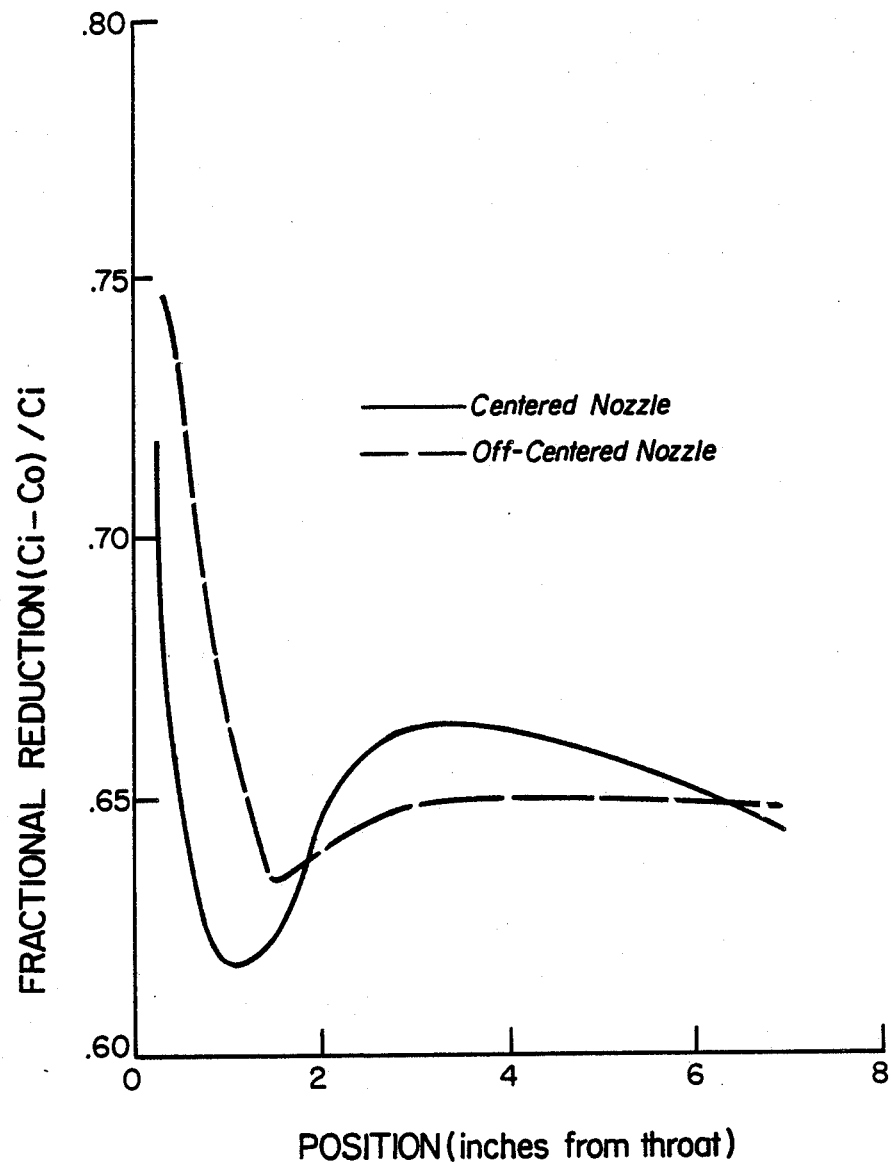
FIG. 14 shows the effect of positioning a gas (nitrogen) injection nozzle off-center at various positions from the throat of a venturi device during the stripping of oxygen from room temperature water. The velocity of gas injection in FIG. 14 is subsonic.
Figure 15:
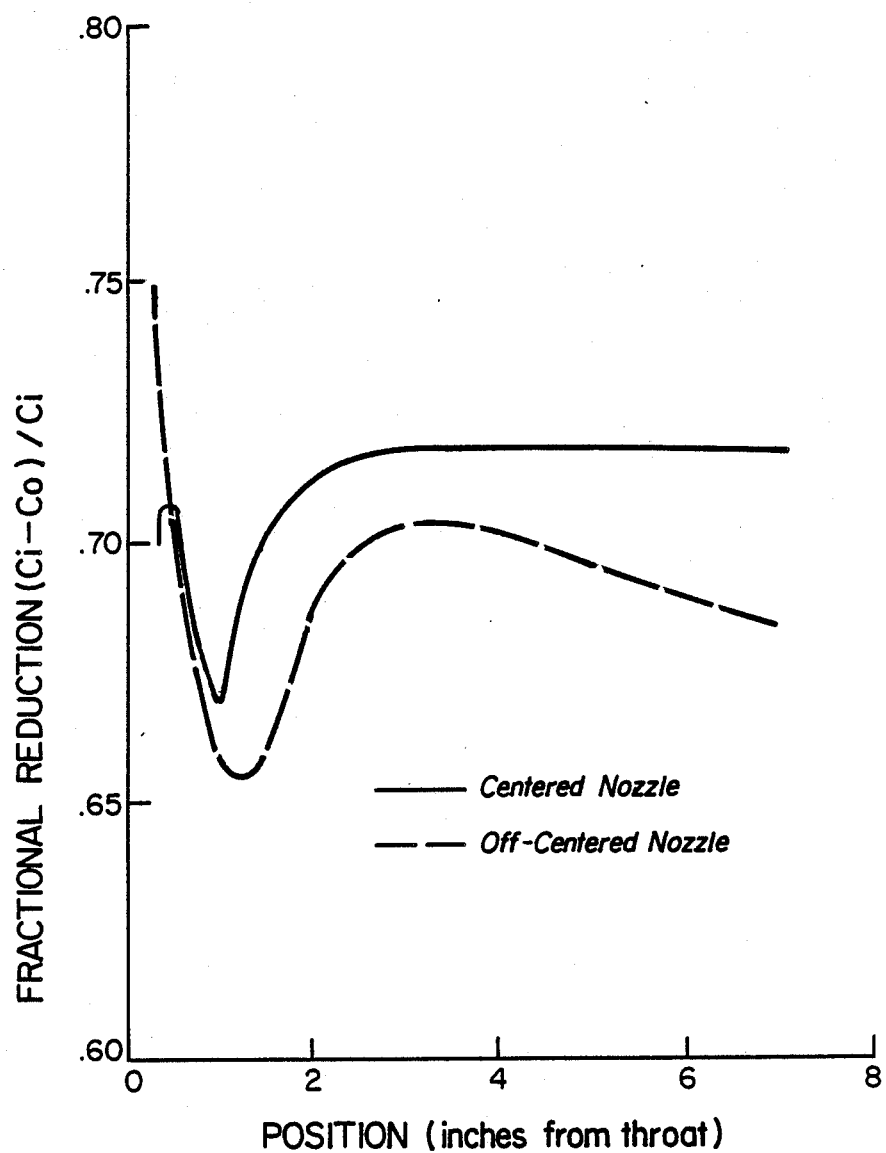
FIG. 15 shows the same effect of injection nozzle position when the velocity of gas injection is supersonic.

FIGS. 14 and 15 show the effect on fractional reduction when the gas-dispersion nozzle is positioned off-center from the venturi throat for subsonic and supersonic stripping gas injection, respectively. Oxygen was removed from room-temperature water using a stripping device of the type shown in FIG. 4 with a bend in tubing 62 when necessary to permit the outside edge of nozzle tip 72 to touch the wall of compression cone 54.

When nitrogen stripping gas was injected into the water at subsonic velocities, as shown in FIG. 14, the stripping rate decreased when the nozzle was positioned off-center and touching the pipe wall outside compression cone 54, which extended about 1.7 inches from venturi throat 56 toward pipe 50. The gas stream appears to be slowed down at the pipe wall, resulting in coagulation of gas bubbles exiting nozzle 60 and thereby reducing the stripping rate. However, when the injection nozzle was positioned inside compression cone 54, the stripping rate increased drastically when the nozzle was placed off-center and touching the compression cone wall. The preferred off-center location for the nozzle is as shown in FIG. 5 when an elbow is used preceding entrance of the liquid flow into the compression cone of the venturi configuration. The maximum flow rate of the liquid occurs at this flow line and assists in maintaining the injected gas linear velocity. It is preferred to use a 90 degree elbow near the entrance to compression cone 104 as shown at FIG. 5, since this provides freedom of access for nozzle 110 and its sleeve 112. In addition, the elbow provides accelerated liquid flow in the area of gases injected from an off center nozzle positioned as shown in FIG. 5.

When nitrogen stripping gas was injected into the water at sonic velocity, as shown in FIG. 15, again, the centered nozzle performed better when positioned outside the compression cone. The centered nozzle continued to perform as well as an off-centered nozzle until the nozzle was positioned at a distance of about 0.5 inches from the venturi throat or closer. At this position, by-pass of the nitrogen gas stream through the center of the water flow was clearly observed, whereby the stripping rate of oxygen gas from the water decreases. Thus, at nozzle positions 0.5 inch or closer to the venturi throat, an off centered nozzle performs better. The position at which such channeling occurs is dependent upon the minimum opening diameter (throat) of the venturi, and a larger diameter minimum opening increases the possibility of channeling of stripping gas, so that use of an off-center nozzle may be required at greater distances upstream of the throat.

EXAMPLE 9

Figure 16:
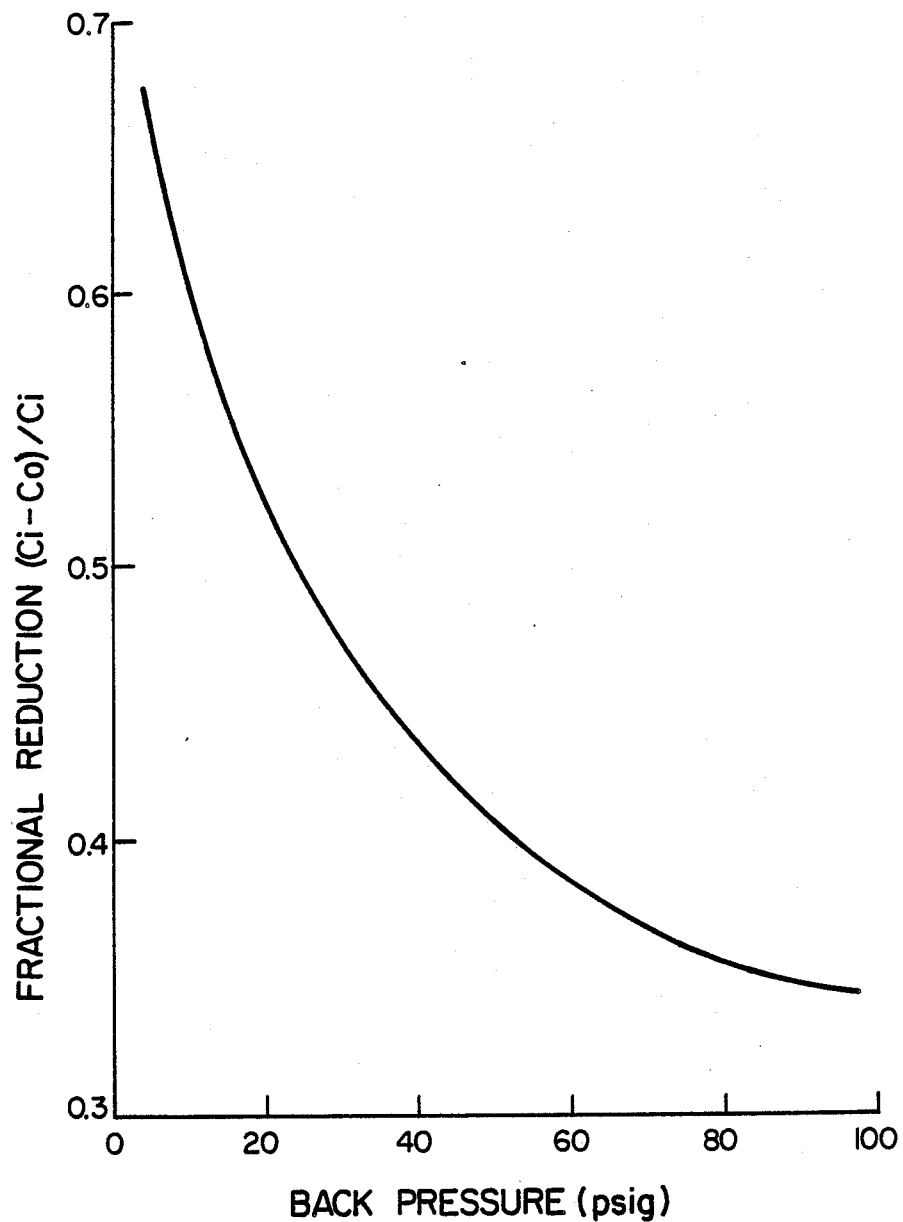
FIG. 16 demonstrates the effect of back pressure (exit pressure) at the exit from the venturi device on the stripping of oxygen from room temperature water. The stripping device is of the type used in FIG. 5. The gas (nitrogen) injection velocity was supersonic.

The back pressure at the exit from the venturi configuration expansion cone was expected to affect stripping rate in accordance with Henry's law. It is generally true that higher pressure favors gas dissolution and lower pressure favors stripping. As shown in FIG. 16, the fractional reduction of oxygen from room temperature water using a nitrogen stripping gas (in an apparatus of the type shown in FIG. 4) decreased rapidly as the exit pressure from the venturi device was increased.

Figure 17:
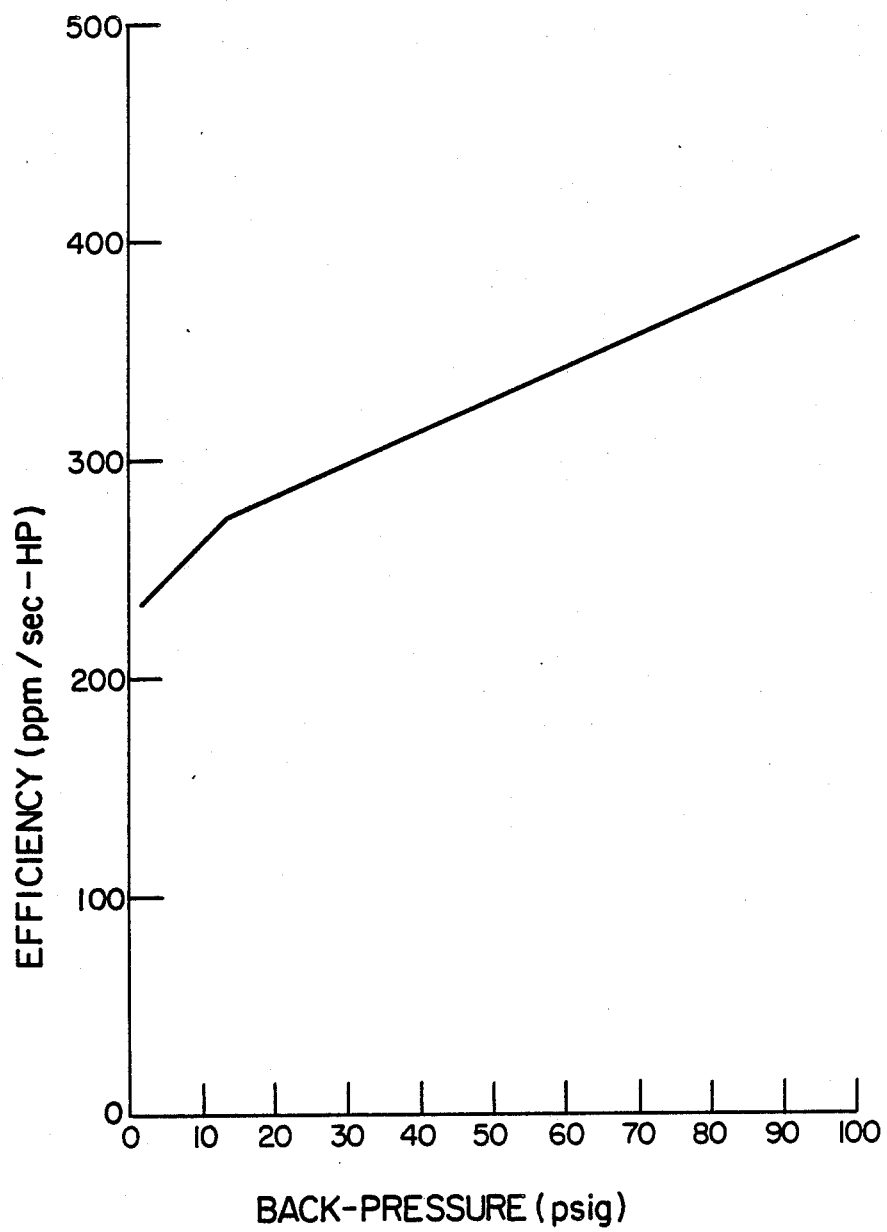
FIG. 17 shows the effect of venturi back pressure on the efficiency of stripping oxygen from water under the same conditions as shown in FIG. 16. Efficiency is expressed as the mass transfer rate (ppm/sec), divided by the power consumption in horsepower.

However, it was discovered that the back pressure in the pipeline at the exit from the venturi expansion cone affected the pressure drop through the venturi significantly more than expected. As a result, the efficiency (as expressed in terms of mass transfer per operational power consumption) increases significantly as the back pressure at the exit from the venturi configuration increases. This unexpected result is shown in FIG. 17. Of course, the required fractional reduction in oxygen content may dictate that efficiency is not the controlling consideration.

EXAMPLE 10

The orientation of the piping within which the gas dispersion apparatus is placed is also important. As shown in FIG. 18 for the stripping of oxygen from room temperature water using nitrogen stripping gas in an apparatus of the type shown in FIG. 4, it is advantageous to vertically orient the piping containing the apparatus.

EXAMPLE 11

Molten aluminum reacts readily with moisture in the air forming hydrogen and aluminum oxide. Hydrogen will remain in the aluminum since it is quite soluble above the melting point of aluminum. The hydrogen must be removed from the molten metal before casting, otherwise cracks or voids may occurs when the hydrogen is driven off at the solidifying temperature of aluminum. The usual procedure for hydrogen removal is to bubble nitrogen, argon or mixtures of inert gases (with very low solubility) through a bath of the molten metal. The molten metal is then overflowed from the bath into a degassing unit where the gas bubbles will rise to the surface and be skimmed off. The inert gas will also remove particulates such as aluminum oxide or other solid impurities. The particulates will adhere to the inside of the gas bubbles due to surface tension. Particulate removal is a important part of the process. The batch process described above, has very low stripping efficiency, however, because of back-mixing of low and high purity materials in this batch mode. The partial pressure of hydrogen in the gas phase is proportional to the square of the hydrogen concentration in the liquid phase. Therefore, the driving force in batch stripping operations becomes quite small as stripping continues.

Use of an in-line stripping device enables contacting a stripping gas with the molten aluminum when the molten aluminum is at its highest concentration of hydrogen and particulates. Therefore, the equilibrium driving forces will be maximized. Molten aluminum at about 700° C. is pumped or pressure transferred from a melting pot through the in-line stripper to a degassing hold tank. The pump and pipings and the in-line stripping device are comprised of or are lined with refractory materials such as graphite, silicon nitrite, or silicon carbide, etc. Preferred stripping gases include nitrogen and argon. A small trace of chlorine may be added to the stripping gas to assist in removal of alkaline metals. Stripping gas at a volumetric flowrate of about 10 scfm is able to handle about 60,000 lb/hr of molten aluminum in a 2.5 inch diameter in-line stripping unit. Stripping gas consumption is about 19.9 scf/ton of aluminum. The optimized stripping gas consumption will vary depending on the concentration of the hydrogen in the molten aluminum; typically the hydrogen concentration ranges from about 0.1 to 0.4 cc/g.

The above described in line stripping techniques are applicable for removal of moisture from organic fluids such as fatty esters and methyl benzoate.

EXAMPLE 12

The examples presented above show the improvement in ability to remove an initially present gas from a liquid using the improved dispersion of a stripping gas which can be achieved using the method and apparatus of the present invention. This example shows the improvement in ability to dissolve a gas in a liquid which can be obtained when the gas to be dissolved is injected into a gas dispersing apparatus of the type shown in FIG. 4 at a sonic velocity rather than at a subsonic velocity.

Figure 7:
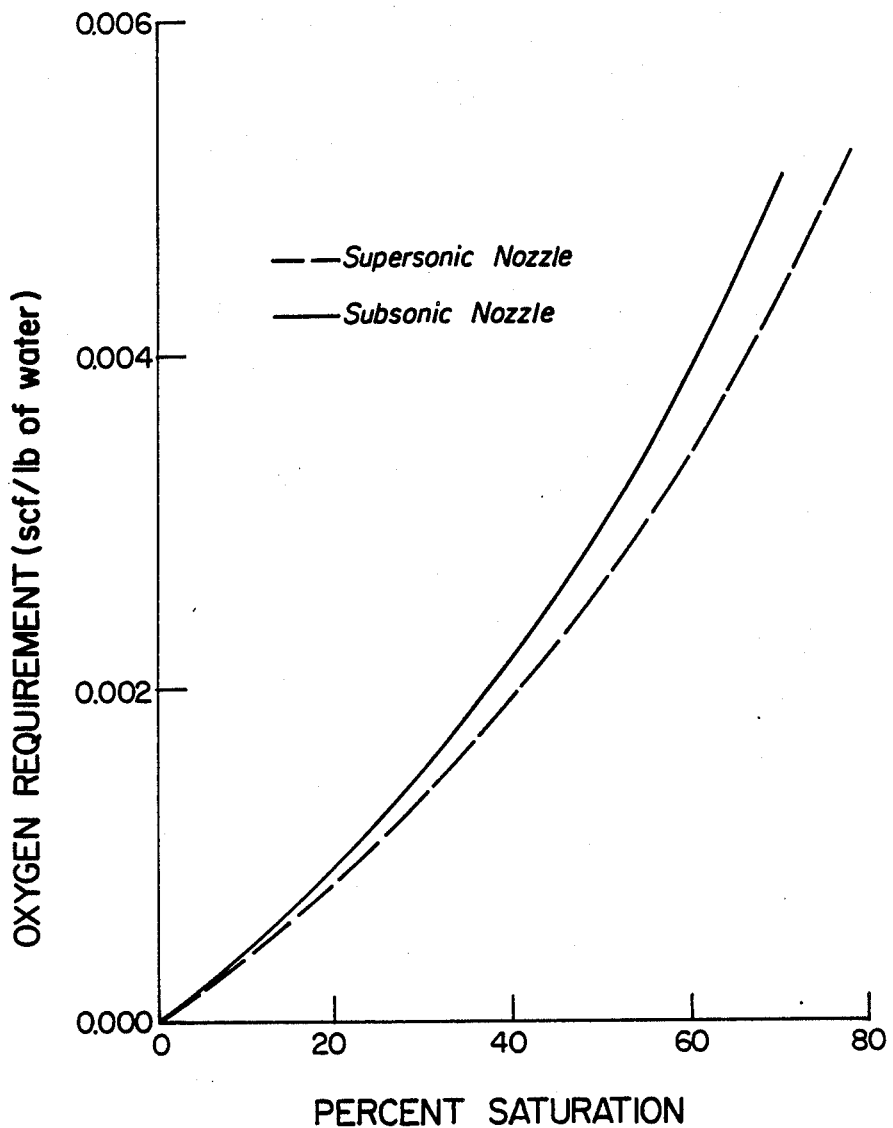
FIG. 7 shows the oxygen requirement per pound of water for dissolving oxygen into water to particular degrees of saturation of the water when the oxygen is injected at a subsonic velocity and at a supersonic velocity using an apparatus of the type shown in FIG. 4.

In this example, the gas being dissolved was oxygen and the liquid into which the gas was dissolved was water. The flow rate of the water through the apparatus was about 5 GPM. The injection nozzle was positioned about 1 inch from the venturi throat which was about 0.19 inches in diameter and about 0.19 inches in length. The operating line pressure downstream of the gas dispersion device was about 5–6 PSIG. At the temperature of the water (about 15° C.), saturation of the water with oxygen occurred at about 48.2 ppm. The oxygen-water mixture passed through approximately a 40 ft. length of ¾ inch diameter piping after exit from the gas dispersing device prior to reaching the oxygen analyzer. The initial oxygen concentration was sufficiently low that it could be neglected in calculating the oxygen requirement to bring the water to a particular percent of saturation with oxygen. FIG. 7 shows the percent saturation achieved at various oxygen loadings (scf of oxygen per pound of water) when subsonic oxygen injection was used versus when sonic oxygen injection was used. The improvement achieved using sonic velocity oxygen injection through the injection nozzle is readily apparent.

Figure 6:
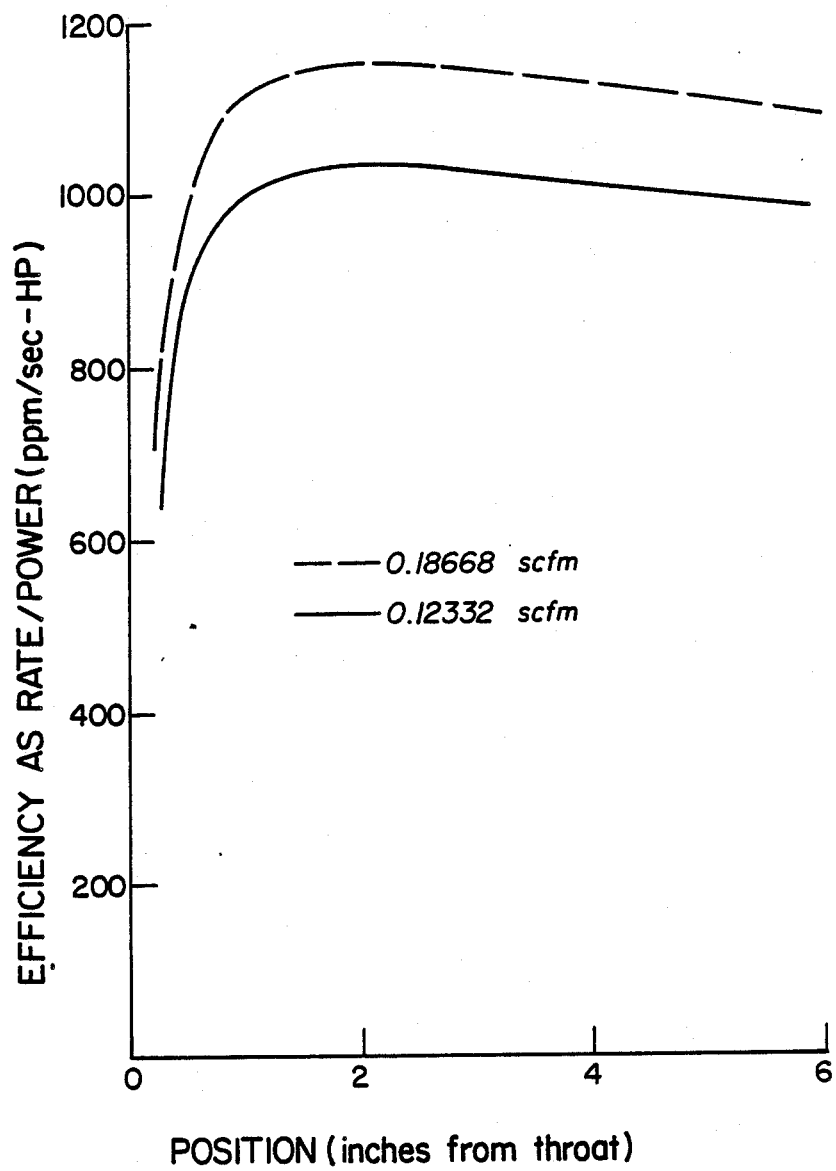
FIG. 6 shows the performance of a gas dispersing apparatus of the type shown in FIG. 4 when it is used to dissolve oxygen in water. In particular.

In addition, as shown in FIG. 6, there is a (centerline) nozzle position upstream of the venturi throat which is optimum in terms of efficiency of gas dissolution. Efficiency is expressed in terms of mass transfer rate per pumping horsepower (ppm/sec HP).

Although the preferred operating conditions for stripping gas and dissolving gas at first appear to be very different, experiments have shown that the improvements observed in dissolving a gas into a liquid using the method and apparatus of the present invention very closely parallel the improvements first observed in stripping a gas from a liquid. In view of the above empirically observed similarities, when the reaction rate of the injected gas with the liquid (or another reactant contained in the liquid) is mass transfer rate controlled (i.e., the reaction is rapid once contact between the reactants occurs), an increase in reaction rate should be observed upon increased dispersion of the injected gas into the liquid. Thus, it now would be expected the present method of dispersing gas, and the apparatus used to practice the method, can be used to increase the reaction rate of injected gas with the liquid or another reactant contained in the liquid.

Figure 23:
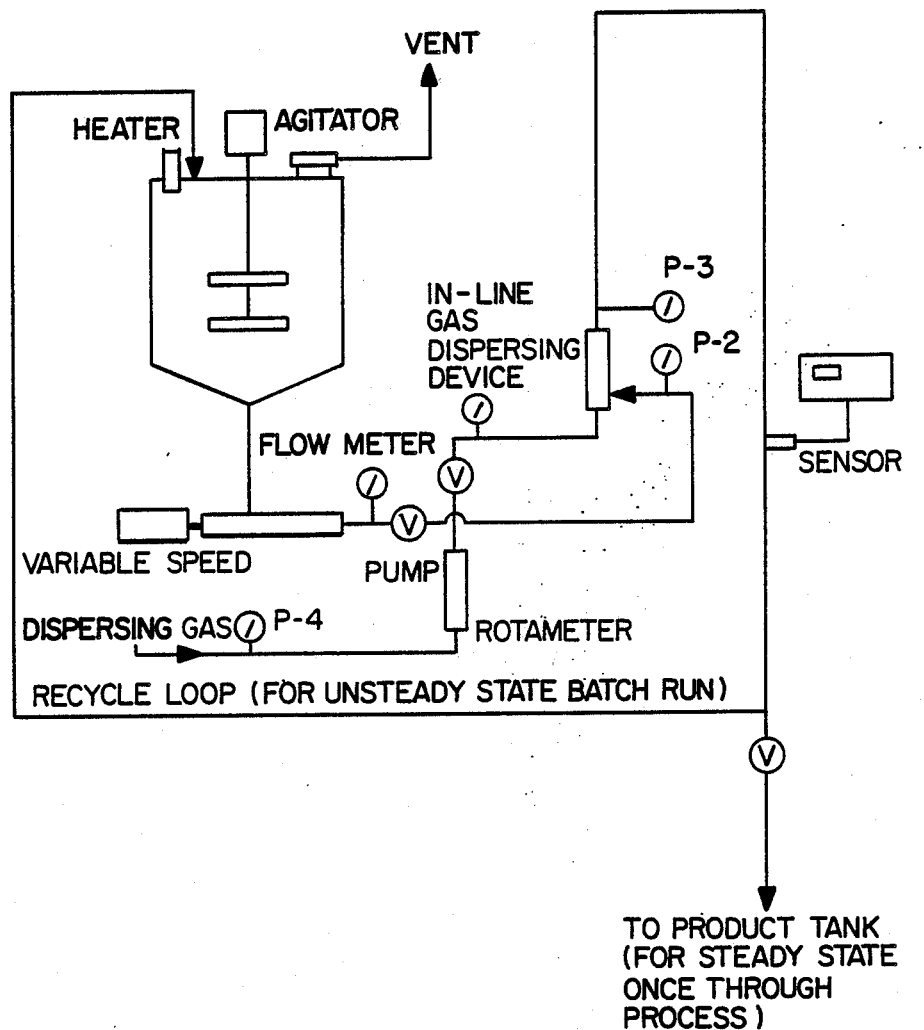
FIG. 23 shows a schematic for a typical gas dispersion system installation; wherein the gas dispersion device is placed in line in a recycle loop of a reactor system, to provide for addition of a dissolved gas, a reactant gas, or for dissolved gas removal during a chemical process reaction. container for a fluid.

A process flow diagram for a gas dispersing system in a reactor process piping loop (not intended to be limiting) is shown in FIG. 23.

Figure 24:
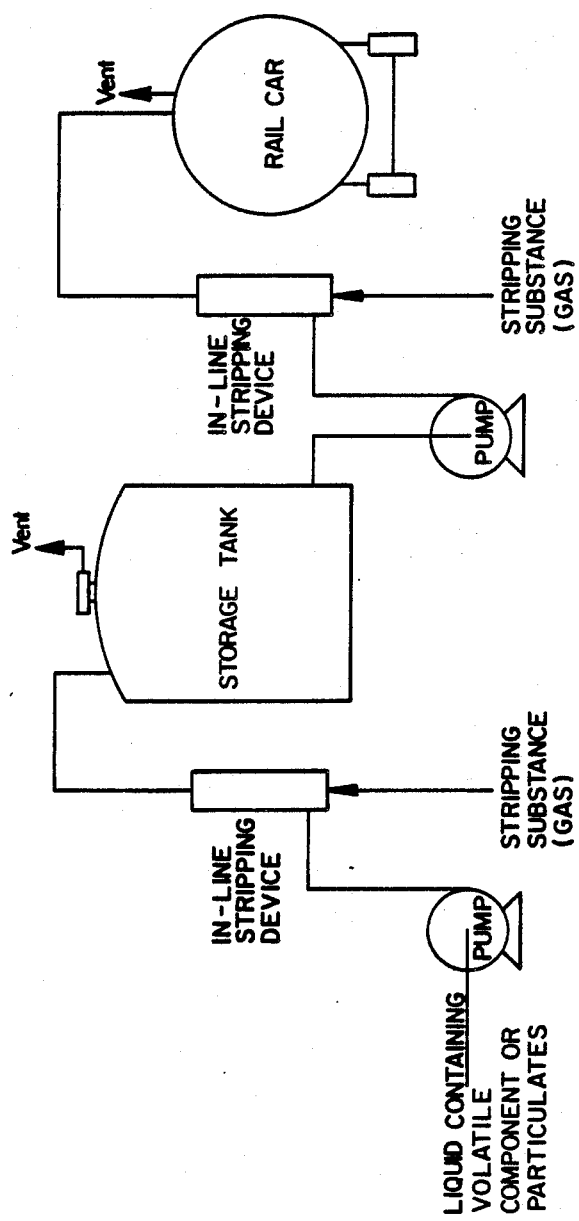
FIG. 24 shows a schematic for a typical gas or vapor stripping system installation, wherein the stripping device is placed in-line prior to storage and/or in-line between a storage tank and shipping fractional reductions in soybean oil (using a nozzle-venturi device of the type shown in FIG. 4.), as a function of the volumetric flow rate of the soybean oil.

A process flow diagram for a typical, not intended to be limiting, system for removing a dissolved gas from a liquid to be stored and/or from a liquid to be shipped is shown in FIG. 24.

Removal of a gas such as oxygen from a liquid to be stored can prevent oxidation of component parts of that liquid during the storage period.

Only the preferred embodiments of the invention have been described above, and one skilled in the art will recognize that numerous substitutions, modifications and alterations are permissible without departing from the spirit and scope of the invention as demonstrated in the following claims.

What is claimed is:

1. An apparatus connected to a source of gas and liquid for dispersing said gas in said liquid, said apparatus comprising:
   (a) at least one means for injecting said gas into said liquid, wherein said means injects said gas at a linear velocity which is at least sonic for at least a portion of said gas flow at the time said gas contacts said liquid, said injection means being located in communication with the entrance to a flow accelerating configuration; and
   (b) at least one flow accelerating configuration for accelerating at least a portion a mixture of said gas and liquid flowing therethrough to sonic velocity, said flow accelerating configuration positioned so that gas injected by said gas injection means enters said flow accelerating configuration.

2. An apparatus for dispersing a gas in a liquid, said apparatus comprising:
   (a) at least one means for injecting a gas into a liquid, wherein said means is located in communication with the entrance to a flow accelerating configuration and off-center from the center line of said flow accelerating configuration; and
   (b) at least one flow accelerating configuration for accelerating a mixture of said gas and liquid to a linear velocity which is at least sonic for at least a portion of the flow of said mixture, said flow accelerating configuration positioned so that gas injected by said gas injection means enters said flow accelerating configuration.

3. The apparatus of claim 1 or claim 2 wherein said injection means and said flow accelerating configuration are positioned inside a pipeline.

4. The apparatus of claim 1 or claim 2 wherein said injection means is positioned vertically beneath the entrance to said flow accelerating configuration, whereby the buoyancy force of said injected gas moves said gas into said flow accelerating configuration.

5. The apparatus of claim 2 wherein said means for injecting a gas is capable of injecting said gas at a linear velocity which is at least sonic for at least a portion of said gas flow at the time said gas contacts said liquid.

6. The apparatus of claim 1 or claim 2 wherein said flow accelerating configuration comprises a venturi.

7. The apparatus of claim 1 wherein said injection means is located off-center from the center line of said flow accelerating configuration.

8. The apparatus of claim 6 wherein the throat length of said venturi is the minimal length which can be reasonably fabricated.

9. The apparatus of claim 6 wherein said gas injection means is positioned inside the compression or entrance cone of said venturi.

10. The apparatus of claim 7 wherein said gas injection means is positioned inside the compression or entrance cone of said venturi.

11. The apparatus of claim 1 or claim 2 wherein said injection means is at least 0.1 pipeline diameters upstream of said flow accelerating configuration minimum diameter opening.

12. The apparatus of claim 11 wherein said flow accelerating configuration is a venturi.

13. The apparatus of claim 12 wherein said venturi configuration throat length is the minimal length which can be reasonably fabricated.

14. The apparatus of claim 13 wherein said injector is positioned within the compression cone of said venturi compression cone.

15. The apparatus of claim 14 wherein said injector is positioned off the centerline from said venturi throat opening.

16. The apparatus of claim 1 or claim 2 wherein said flow accelerating configuration minimum opening is as large as possible and still provides sufficient supersonic velocity in said at least a portion of said gas-liquid mixture to accomplish the desired gas dispersion.

17. The apparatus of claim 6 including a means for controlling the back pressure at the exit from the expansion cone of said venturi.

18. A method of dissolving a gas in a liquid, said method comprising:
 (a) contacting said liquid with said gas to be dissolved therein by injecting said gas into said liquid through a nozzle at a linear velocity which is at least sonic for at least a portion of said gas at the time it contacts said liquid;
 (b) causing cocurrent flow of a composition comprising said injected gas in said liquid; and
 (c) causing at least a portion of said cocurrently flowing composition to flow at a linear velocity which is at least sonic.

19. The method of claim 18 wherein said method is carried out inside a pipeline.

20. The method of claim 18 wherein causing at least a portion of said cocurrently flowing composition to flow at a lineat velocity which is at least sonic includes conducting said cocurrently flowing composition through at least one flow accelerating configuration.

21. The method of claim 20 and including directing said cocurrently flowing composition into and off centerline of said at least one flow accelerating configuration.

22. The method of claim 20 further including the step of controlling the back pressure of said at least one flow accelerating configuration.

23. A method of dispersing a gaseous or vaporous reactant into a reactant liquid or into a liquid containing a reactant, said method comprising:
 (a) contacting said gaseous reactant with said liquid by injecting said gas into said liquid through a nozzle at a linear velocity which is at least sonic for at least a portion of said gas at the time it contacts said liquid;
 (b) causing cocurrent flow of a composition comprising said injected gaseous reactant in said liquid; and
 (c) causing at least a portion of said cocurrently flowing composition to flow at a linear velocity which is at least sonic.

24. The method of claim 23 wherein said method is carried out inside a pipeline.

25. The method of claim 23 wherein causing at least a portion of said cocurrently flowing composition to flow at a linear velocity which is at least sonic includes conducting said cocurrently flowing composition through at least one flow accelerating configuration.

26. The method of claim 25 and including directing said cocurrently flowing composition into and off centerline of said at least one flow accelerating configuration.

27. The method of claim 25 further including the step of controlling the back pressure of said at least one flow accelerating configuration.

28. A method for dispersing a gas in a liquid, said method comprising:
 (a) injecting said gate into said liquid;
 (b) causing cocurrent flow of a composition comprising said injected gas and at least a portion of said liquid;
 (c) directing said flow into and off centerline of at least one flow accelerating configuration; and
 (d) causing at least a portion of said composition to flow at a velocity which is at least sonic.

29. The method of claim 28 wherein said gas is injected at a linear velocity which is at least sonic for at least a portion of said gas at the time it contacts said liquid.

30. The method of claim 28 further including the step of controlling the back pressure of said at least one flow accelerating configuration.

* * * * *

UNITED STATES PATENT AND TRADEMARK OFFICE
CERTIFICATE OF CORRECTION

PATENT NO. : 4,931,225
DATED : June 5, 1990
INVENTOR(S) : Alan T. Cheng

It is certified that error appears in the above-identified patent and that said Letters Patent is hereby corrected as shown below:

Column 3, line 10, delete "127711" and substitute therefor --2127711--.

Column 15, lines 9-12, delete "FIG. 24 shows a schematic for a typical gas or vapor stripping system installation, wherein the stripping device is placed in-line prior to storage and/or in-line between a storage tank and shipping".

Column 15, line 39, delete "container for a fluid.".

Column 15, line 40, insert the following paragraph: --FIG. 24 shows a schematic for a typical gas or vapor stripping system installation, wherein the stripping device is placed in-line prior to storage and/or in-line between a storage tank and a shipping container for a fluid.--.

Column 28, line 35, after "portion" insert --of--.

Signed and Sealed this

Seventeenth Day of December, 1991

Attest:

HARRY F. MANBECK, JR.

*Attesting Officer*  *Commissioner of Patents and Trademarks*